(12) United States Patent
Sato et al.

(10) Patent No.: US 10,727,534 B2
(45) Date of Patent: Jul. 28, 2020

(54) ELECTROLYTE SOLUTION CONTAINING MAGNESIUM IONS

(71) Applicant: FUJIFILM Wako Pure Chemical Corporation, Osaka-shi, Osaka (JP)

(72) Inventors: Kazuhiko Sato, Saitama (JP); Goro Mori, Saitama (JP); Hiromi Watahiki, Saitama (JP); Takahiro Kiyosu, Saitama (JP); Kuniaki Okamoto, Saitama (JP)

(73) Assignee: FUJIFILM Wako Pure Chemical Corporation, Osaka (JP)

( * ) Notice: Subject to any disclaimer, the term of this patent is extended or adjusted under 35 U.S.C. 154(b) by 136 days.

(21) Appl. No.: 16/089,989

(22) PCT Filed: Mar. 31, 2017

(86) PCT No.: PCT/JP2017/013499
§ 371 (c)(1),
(2) Date: Sep. 28, 2018

(87) PCT Pub. No.: WO2017/170976
PCT Pub. Date: Oct. 5, 2017

(65) Prior Publication Data
US 2019/0131657 A1 May 2, 2019

(30) Foreign Application Priority Data

Apr. 1, 2016 (JP) ................................ 2016-073930
Nov. 28, 2016 (JP) ................................ 2016-230682

(51) Int. Cl.
*H01M 10/0568* (2010.01)
*H01M 10/054* (2010.01)
(Continued)

(52) U.S. Cl.
CPC .......... *H01M 10/0568* (2013.01); *C07F 5/02* (2013.01); *C07F 5/025* (2013.01); *H01M 10/054* (2013.01);
(Continued)

(58) Field of Classification Search
CPC ........ H01M 10/0568; H01M 10/0567; H01M 10/0569; H01M 10/054; H01M 2300/0025; C07F 5/02; C07F 5/025
See application file for complete search history.

(56) References Cited

U.S. PATENT DOCUMENTS 8,722,242 B2    5/2014  Muldoon et al.
2014/0038061 A1* 2/2014  Mohtadi .......... H01M 10/0566
                                                429/337
(Continued)

FOREIGN PATENT DOCUMENTS

JP         2014-229620        12/2014

OTHER PUBLICATIONS

Aurbach, et al., "Prototype systems for rechargeable magnesium batteries", Nature, vol. 47, Oct. 12, 2000, pp. 724-727.
(Continued)

*Primary Examiner* — Lisa S Park
(74) *Attorney, Agent, or Firm* — Hamre, Schumann, Mueller & Larson, P.C.

(57) ABSTRACT

An object of the present invention is to provide a highly practical electrolytic solution which has a high oxidative decomposition potential, enables the dissolution and precipitation of magnesium to stably repeatedly proceed, and is easy to prepare. The present invention relates to an electrolytic solution for a magnesium battery comprising: a compound represented by the general formula (I), a Lewis acid or a compound represented by the general formula (A), and a solvent; and to the compound represented by the general formula (I). In the formula (I), two X's each independently represent a halogeno group, and $R^1$ represents an alkyl group having 1 to 6 carbon atoms; an alkoxy group having 1 to 6 carbon atoms; a phenoxy group; a —OMgX group (X is the same as X described above); an aryl group having 6 to 18 carbon atoms which has, as a substituent, an alkyl group having 1 to 6 carbon atoms, an alkoxy group having 1 to 6 carbon atoms, a vinyl group, a phenyl group, a phenoxy group, a halogeno group or a —B(OMgX)$_2$ group (X is the same as X described above) or is unsubstituted; or a monocyclic or bicyclic heterocyclic group which has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group (X is the same as X described above) or is unsubstituted. In the general formula (A), four $R^6$'s each independently represent an alkyl group having 1 to 6 carbon atoms, a perfluoroalkyl group having 1 to 6 carbon atoms, a phenyl group, or a perfluorophenyl group.

9 Claims, 6 Drawing Sheets

(51) Int. Cl.
H01M 10/0569 (2010.01)
C07F 5/02 (2006.01)
H01M 10/0567 (2010.01)

(52) U.S. Cl.
CPC ... *H01M 10/0567* (2013.01); *H01M 10/0569* (2013.01)

(56) References Cited

U.S. PATENT DOCUMENTS

2014/0349178 A1  11/2014  Mohtadi et al.
2014/0349199 A1  11/2014  Mohtadi et al.

OTHER PUBLICATIONS

Aurbach, et al., "Electrolyte Solutions for Rechargeable Magnesium Batteries Based on Organomagnesium Chloroaluminate Complexes", Journal of the Electrochemical Society, vol. 149, No. 2, 2002, pp. A115-A121.

* cited by examiner

ELECTROLYTE SOLUTION CONTAINING MAGNESIUM IONS

TECHNICAL FIELD

The present invention relates to an electrolytic solution containing magnesium ions and an electrochemical device containing the electrolytic solution.

BACKGROUND ART

Magnesium ions are polyvalent ions, and accordingly, the electric capacity of magnesium per unit volume is high. In addition, magnesium has a higher melting point and is safer compared to lithium, magnesium resources are relatively evenly distributed on earth, and magnesium is inexpensive because the resources are abundant on earth. Therefore, a magnesium ion battery adopting metallic magnesium as a negative electrode is drawing attention as a next-generation battery replacing a lithium ion battery.

However, in the magnesium ion battery adopting metallic magnesium as a negative electrode, magnesium reacts with an electrolytic solution owing to its high reducibility, and as a result, a passive film is formed on the electrode surface. Consequently, reversible dissolution-precipitation of magnesium is hindered, which makes it difficult for a negative electrode reaction to occur.

As an electrolytic solution which does not form the passive film, an electrolytic solution containing a Grignard reagent RMgX (R represents an alkyl group or an aryl group and X represents chlorine or bromine) as an electrolyte is known, and this electrolytic solution has been confirmed to enable reversible dissolution-precipitation of magnesium. However, because the Grignard reagent RMgX is strongly basic, the electrolytic solution has a safety issue. Furthermore, unfortunately, the electrolytic solution is impractical because oxidative stability thereof is low.

Therefore, an electrolytic solution having improved safety and performance has been developed by mixing the strongly basic Grignard reagent or an organic magnesium reagent with a Lewis acid having boron or aluminum.

For example, Aurbach and others have reported that a tetrahydrofuran solution of an electrolyte $Mg(AlCl_2BuEt)_2$ in which aluminum is bonded to a halogen enables magnesium to be dissolved-precipitated with high efficiency and has high voltage resistance (Non-Patent Literature 1, 2, and the like). However, this solution has an oxidative decomposition potential of about +2.5 V for magnesium, and hence the oxidative stability thereof is still not high enough for the solution to be a substitute for a lithium ion battery.

There is also an electrolytic solution known to use boron as a Lewis acid, enable dissolution-precipitation of magnesium as well, and exhibit high voltage resistance. For example, Muldoon and others have reported an electrolytic solution adopting $[Mg_2(\mu\text{-}Cl)_3\cdot 6THF][BR_4]$ as an electrolyte (Patent Literature 1 and the like). Herein, R each represents an alkyl group or an aryl group which may be substituted with an alkyl group, an alkoxy group, a cyano group, or a nitro group. According to the literature, even though any of a platinum electrode and a stainless steel electrode is used as a working electrode for magnesium, approximately the same level of oxidative stability is realized, but the oxidative stability does not reach 3 V for magnesium.

As another example of the boron-based electrolyte, Mohtadi and others have reported $Mg(BX_4)_2$ (X represents hydrogen, fluorine, or alkoxy group) in US 2014038061 (Patent Literature 2). However, the literature just describes that in a case where glassy carbon is used as a working electrode, the boron-based electrolyte remains stable up to 2.3 V for magnesium. In addition, Mohtadi and others have also reported an electrolytic solution containing a carboranyl magnesium electrolyte and realized oxidative stability higher than 3 V in the electrolytic solution containing boron (Patent Literature 3). However, the electrolytic solution has an issue of practicality because the electrolyte has a special structure and uses raw material lacking generality.

CITATION LIST

Patent Literature

Patent Literature 1: U.S. Pat. No. 8,722,242 B
Patent Literature 2: US 2014/0038061 A
Patent Literature 3: JP 2014-229620 A

Non-Patent Literature

Non-Patent Literature 1: Nature, 2000, 407, 724
Non-Patent Literature 2: J. Electrochem., Soc., 2002, 149, A115

SUMMARY OF INVENTION

Technical Problem

The inventors of the present invention conducted earnest examinations in consideration of the circumstances. As a result, the inventors have accomplished the present invention by obtaining knowledge that an electrolytic solution, which is obtained by mixing a magnesium salt of boronic acid or a magnesium salt of boric acid with a Lewis acid or magnesium sulfonylimide having a specific structure in an appropriate solvent, has an excellent oxidative decomposition potential equal to or higher than 3 V for magnesium.

That is, an object of the present invention is to provide a highly practical electrolytic solution which has a high oxidative decomposition potential, enables the dissolution-precipitation of magnesium to repeatedly and stably proceed, and is easy to prepare.

Solution to Problem

The present invention relates to an electrolytic solution for a magnesium battery comprising: a compound represented by the general formula (I), a Lewis acid or a compound represented by the general formula (A), and a solvent that are mixed together; and to the compound represented by the general formula (I):

(I)

wherein two X's each independently represent a halogeno group, and $R^1$ represents an alkyl group having 1 to 6 carbon atoms; an alkoxy group having 1 to 6 carbon atoms; a phenoxy group; a —OMgX group (X is the same as X described above); an aryl group having 6 to 18 carbon atoms which has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group (X is the same as X described above) or is unsubstituted (hereinafter, the aryl group is simply described as aryl group which has a substituent or is unsubstituted in some cases); or a monocyclic or bicyclic heterocyclic group which has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group (X is the same as X described above) or is unsubstituted (hereinafter, the heterocyclic group is simply described as heterocyclic group which has a substituent or is unsubstituted in some cases);

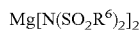
(A)

wherein four R$^6$'s each independently represent an alkyl group having 1 to 6 carbon atoms, a perfluoroalkyl group having 1 to 6 carbon atoms, a phenyl group, or a perfluorophenyl group.

Another aspect of the present invention relates to an electrolytic solution for a magnesium battery described below and a compound represented by the following general formula (I).

An electrolytic solution for a magnesium battery comprising: a compound represented by the following general formula (I), a Lewis acid, and a solvent that are mixed together;

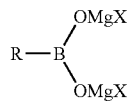
(I)

wherein X represents a halogeno group, and R represents an alkyl group having 1 to 6 carbon atoms, an alkoxy group having 1 to 6 carbon atoms, a phenoxy group, a —OMgX group (X is the same as X described above); an aryl group having 6 to 18 carbon atoms which may have, as a substituent, an alkyl group having 1 to 6 carbon atoms, an alkoxy group having 1 to 6 carbon atoms, a phenoxy group, a halogeno group, a vinyl group, a phenyl group, or a —B(OMgX)$_2$ group (X is the same as X described above); or a monocyclic or bicyclic heterocyclic group which may have, as a substituent, an alkyl group having 1 to 6 carbon atoms, an alkoxy group having 1 to 6 carbon atoms, a phenoxy group, a halogeno group, a vinyl group, a phenyl group, or a B(OMgX)$_2$ group (X is the same as X described above).

Another aspect of the present invention relates to an electrolytic solution for a magnesium battery described below and a compound represented by the following general formula (I).

An electrolytic solution for a magnesium battery comprising: a compound represented by the following general formula (I), a Lewis acid, and a solvent that are mixed together;

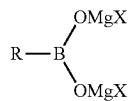
(I)

wherein X represents a halogeno group, and R represents an alkyl group having 1 to 6 carbon atoms, an alkoxy group having 1 to 6 carbon atoms, a phenoxy group, a —OMgX group (X is the same as X described above); an aryl group having 6 to 18 carbon atoms which has, as a substituent, an alkyl group having 1 to 6 carbon atoms, an alkoxy group having 1 to 6 carbon atoms, a phenoxy group, a halogeno group, a vinyl group, a phenyl group, or a —B(OMgX)$_2$ group (X is the same as X described above) or is unsubstituted; or a monocyclic or bicyclic heterocyclic group which has, as a substituent, an alkyl group having 1 to 6 carbon atoms, an alkoxy group having 1 to 6 carbon atoms, a phenoxy group, a halogeno group, a vinyl group, a phenyl group, or a —B(OMgX)$_2$ group (X is the same as X described above) or is unsubstituted.

Advantageous Effects of Invention

The electrolytic solution of the present invention has an oxidative decomposition potential which is equivalent to or higher than that of the electrolytic solution of the related art, and enables the dissolution-precipitation of magnesium to be stably repeated. Furthermore, the electrolytic solution can be easily prepared.

DESCRIPTION OF EMBODIMENTS

—Compound Represented by General Formula (I)—

Figure 1:
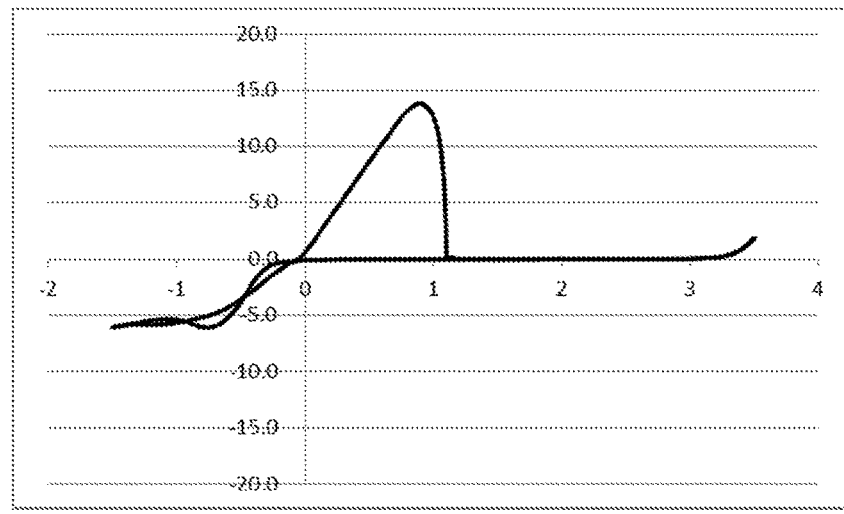
FIG. 1 shows a cyclic voltammetry (CV) result obtained in the 10$^{th}$ cycle from an electrolytic solution 1 measured in Example 23.

The compound represented by the general formula (I) is represented by the following formula.

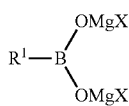
(I)

wherein two X's each independently represent a halogeno group, and $R^1$ represents an alkyl group having 1 to 6 carbon atoms; an alkoxy group having 1 to 6 carbon atoms; a phenoxy group; a —OMgX group (X is the same as X described above); an aryl group having 6 to 18 carbon atoms which has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group (X is the same as X described above) or is unsubstituted; or a monocyclic or bicyclic heterocyclic group which has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group (X is the same as X described above) or is unsubstituted.

Examples of a halogeno group represented by X include a fluoro group, a chloro group, a bromo group, an iodo group and the like. Among these, a chloro group is preferable.

The halogeno groups represented by two X's may be the same as or different from each other. It is preferable that the halogeno groups are the same as each other.

As an alkyl group having 1 to 6 carbon atoms represented by $R^1$, an alkyl group having 1 to 3 carbon atoms is preferable. In addition, the alkyl group may be linear, branched, or cyclic. Among these, a linear alkyl group is preferable. Specific examples of such an alkyl group include a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, an isohexyl group, a sec-hexyl group, a tert-hexyl group, a 3-methylpentyl group, a 2-methylpentyl group, a 1,2-dimethylbutyl group, a cyclopentyl group, a cyclohexyl group, and the like. Among these, a linear alkyl group having 1 to 3 carbon atoms such as a methyl group, an ethyl group, or a n-propyl group is preferable, and a methyl group is more preferable.

As an alkoxy group having 1 to 6 carbon atoms represented by $R^1$, an alkoxy group having 1 to 3 carbon atoms is preferable. In addition, the alkoxy group may be linear, branched, or cyclic. Among these, a linear alkoxy group is preferable. Specific examples of such an alkoxy group include a methoxy group, an ethoxy group, a n-propoxy group, an isopropoxy group, a n-butoxy group, an isobutoxy group, a sec-butoxy group, a tert-butoxy group, a n-pentyloxy group, a n-hexyloxy group, a cyclopentyl group, a cyclohexyl group, and the like. Among these, a linear alkoxy group having 1 to 3 carbon atoms such as a methoxy group, an ethoxy group, or a n-propoxy group is preferable, and a methoxy group is more preferable.

Examples of a —B(OMgX)$_2$ group represented by $R^1$ include a —B(OMgF)$_2$ group, a —B(OMgCl)$_2$ group, a —B(OMgBr)$_2$ group, a —B(OMgI)$_2$ group, and the like. Among these, a —B(OMgCl)$_2$ group is preferable.

Specific examples and preferred examples of an alkyl group having 1 to 6 carbon atoms and an alkoxy group having 1 to 6 carbon atoms which are substituents in the aryl group represented by $R^1$ which has a substituent or is unsubstituted or in the heterocyclic group represented by $R^1$ which has a substituent or is unsubstituted are the same as the specific examples of the alkyl group having 1 to 6 carbon atoms represented by $R^1$ and the alkoxy group having 1 to 6 carbon atoms represented by $R^1$.

Examples of a halogeno group, which is a substituent in the aryl group represented by $R^1$ which has a substituent or is unsubstituted or in the heterocyclic group represented by $R^1$ which has a substituent or is unsubstituted, include a fluoro group, a chloro group, a bromo group, an iodo group, and the like. Among these, a fluoro group is preferable.

Specific examples and preferred examples of a —B(OMgX)$_2$ group, which is a substituent in the aryl group represented by $R^1$ which has a substituent or is unsubstituted or in the heterocyclic group represented by $R^1$ which has a substituent or is unsubstituted, are the same as the specific examples of the —B(OMgX)$_2$ group represented by $R^1$.

Examples of an aryl group having 6 to 18 carbon atoms represented by $R^1$ which has a substituent or is unsubstituted include groups represented by general formulae (II), (III), and (IV). Among these, an aryl group having 6 or 10 carbon atoms represented by the general formula (II) or (III) is preferable, and an aryl group having 6 carbon atoms represented by the general formula (II) is more preferable.

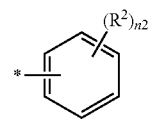
(II)

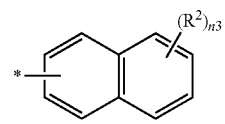
(III)

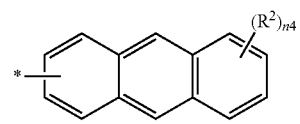
(IV)

In the formulae, $R^2$ represents an alkyl group having 1 to 6 carbon atoms, an alkoxy group having 1 to 6 carbon atoms, a vinyl group, a phenyl group, a phenoxy group, a halogeno group, or a —B(OMgX)$_2$ group (X is the same as X described above), $n_2$ represents an integer of 0 to 5, $n_3$ represents an integer of 0 to 7, $n_4$ represents an integer of 0 to 9, and * represents a bond.

Specific examples and preferred examples of an alkyl group having 1 to 6 carbon atoms, an alkoxy group having 1 to 6 carbon atoms, an halogeno group, and an —B(OMgX)$_2$ group represented by $R^2$ are the same as the specific examples of the alkyl group having 1 to 6 carbon atoms, the alkoxy group having 1 to 6 carbon atoms, the halogeno group, and the —B(OMgX)$_2$ group represented by $R^1$.

As $R^2$, an alkyl group having 1 to 6 carbon atoms, an alkoxy group having 1 to 6 carbon atoms, a phenyl group, a phenoxy group, a halogeno group, a —B(OMgCl)$_2$ group, and the like are preferable. Among these, a linear alkyl group having 1 to 3 carbon atoms such as a methyl group, an ethyl group, or a n-propyl group; a linear alkoxy group having 1 to 3 carbon atoms such as a methoxy group, an ethoxy group, or a n-propoxy group; a phenyl group; a phenoxy group; a fluoro group; a —B(OMgCl)$_2$ group; and the like are more preferable, and a methyl group, a methoxy group, a phenyl group, a phenoxy group, a fluoro group, and a —B(OMgCl)$_2$ group are even more preferable.

The $n_2$ represents an integer of 0 to 5. The $n_2$ is preferably an integer of 0 to 3, and more preferably an integer of 0 to 2.

The $n_3$ represents an integer of 0 to 7. The $n_3$ is preferably an integer of 0 to 3, and more preferably 0.

The $n_4$ represents an integer of 0 to 5. The $n_4$ is preferably an integer of 0 to 3, and more preferably 0.

Specific examples of an aryl group having 6 carbon atoms which is represented by the general formula (II) and has a substituent or is unsubstituted include a phenyl group; a tolyl group, a xylyl group, a mesityl group, an ethyl phenyl group, a diethyl phenyl group, a triethyl phenyl group, a n-propylphenyl group, a di-n-propylphenyl group, a tri-n-propylphenyl group, a n-butylphenyl group, a di-n-butylphenyl group, a tri-n-butylphenyl group, a n-pentylphenyl group, a di-n-pentylphenyl group, a tri-n-pentylphenyl group, a n-hexylphenyl group, a di-n-hexylphenyl group, a tri-n-hexylphenyl group; a methoxyphenyl group, a dimethoxyphenyl group, a trimethoxyphenyl group, an ethoxyphenyl group, a diethoxyphenyl group, a triethoxyphenyl group, a n-propoxyphenyl group, a di-n-propoxyphenyl group, a tri-n-propoxyphenyl group, a n-butoxyphenyl group, a di-n-butoxyphenyl group, a tri-n-butoxyphenyl group, a n-pentyloxyphenyl group, a di-n-pentyloxyphenyl group, a tri-n-pentyloxyphenyl group, n-hexyloxyphenyl group, a di-n-hexyloxyphenyl group, a tri-n-hexyloxyphenyl group; a vinyl phenyl group; a biphenyl group; a phenoxyphenyl group; a fluorophenyl group, a difluorophenyl group, a trifluorophenyl group, a tetrafluorophenyl group, a perfluorophenyl group, a chlorophenyl group, a dichlorophenyl group, a trichlorophenyl group, a tetrachlorophenyl group, a perchlorophenyl group, a bromophenyl group, a dibromophenyl group, a tribromophenyl group, a tetrabromophenyl group, a perbromophenyl group, an iodophenyl group, a diiodophenyl group, a triiodophenyl group, a tetraiodophenyl group, a periodophenyl group; a —C$_6$H$_4$—B(OMgCl)$_2$ group, and the like. Among these, a phenyl group; a tolyl group, a xylyl group, a mesityl group, an ethyl phenyl group, a diethyl phenyl group, a triethyl phenyl group, a n-propylphenyl group, a di-n-propylphenyl group, a tri-n-propylphenyl group; a methoxyphenyl group, a dimethoxyphenyl group, a trimethoxyphenyl group, an ethoxyphenyl group, a diethoxyphenyl group, a triethoxyphenyl group, a n-propoxyphenyl group, a di-n-propoxyphenyl group, a tri-n-propoxyphenyl group; a biphenyl group; a phenoxyphenyl group; a fluorophenyl group, a difluorophenyl group, a trifluorophenyl group; and a —C$_6$H$_4$—B(OMgCl)$_2$ group are preferable, and a phenyl group is more preferable.

Specific examples of the aryl group having 10 carbon atoms represented by the general formula (III) which has a substituent or is unsubstituted include a naphtyl group; a methyl naphthyl group, a dimethyl naphthyl group, a trimethyl naphthyl group, an ethyl naphthyl group, a diethyl naphthyl group, a triethyl naphthyl group, a n-propylnaphthyl group, a di-n-propylnaphthyl group, a tri-n-propylnaphthyl group, a n-butylnaphthyl group, a di-n-butylnaphthyl group, a tri-n-butylnaphthyl group, a n-pentylnaphthyl group, a di-n-pentylnaphthyl group, a tri-n-pentylnaphthyl group, a n-hexylnaphthyl group, a di-n-hexylnaphthyl group, a tri-n-hexylnaphthyl group; a methoxynaphthyl group, a dimethoxynaphthyl group, a trimethoxynaphthyl group, an ethoxynaphthyl group, a diethoxynaphtyl group, a triethoxynaphthyl group, a n-propoxynaphthyl group, a di-n-propoxynaphthyl group, a tri-n-propoxynaphthyl group, a n-butoxynaphthyl group, a di-n-butoxynaphthyl group, a tri-n-butoxynaphthyl group, a n-pentyloxynaphthyl group, a di-n-pentyloxynaphthyl group, a tri-n-pentyloxynaphthyl group, a n-hexyloxynaphthyl group, a di-n-hexyloxynaphthyl group, a tri-n-hexyloxynaphthyl group; a vinyl naphthyl group; a phenyl naphthyl group; a phenoxynaphthyl group; a fluoronaphthyl group, a difluoronaphthyl group, a trifluoronaphthyl group, a tetrafluoronaphthyl group, a perfluoronaphthyl group, a chloronaphthyl group, a dichloronaphthyl group, a trichloronaphthyl group, a tetrachloronaphthyl group, a perchloronaphthyl group, a bromonaphthyl group, a dibromonaphthyl group, a tribromonaphthyl group, a tetrabromonaphthyl group, a perbromonaphthyl group, an iodonaphthyl group, a diiodonaphthyl group, a triiodonaphthyl group, a tetraiodonaphthyl group, a periodonaphthyl group; a —C$_{10}$H$_6$—B(OMgCl)$_2$— group, and the like. Among these, a naphthyl group; a methyl naphthyl group, a dimethyl naphthyl group, a trimethyl naphthyl group, an ethyl naphthyl group, a diethyl naphthyl group, a triethyl naphthyl group, a n-propylnaphthyl group, a di-n-propylnaphthyl group, a tri-n-propylnaphthyl group; a methoxynaphthyl group, a dimethoxynaphthyl group, a trimethoxynaphthyl group, a ethoxynaphthyl group, a diethoxynaphthyl group, a triethoxynaphthyl group, a n-propoxynaphthyl group, a di-n-propoxynaphthyl group, a tri-n-propoxynaphthyl group; a phenyl naphthyl group; a phenoxynaphthyl group; a fluoronaphthyl group, a difluoronaphthyl group, a trifluoronaphthyl group; and a —C$_{10}$H$_6$—B(OMgCl)$_2$— group are preferable, and a naphthyl group is more preferable.

Specific examples of an aryl group having 14 carbon atoms represented by the general formula (IV) which has a substituent or is unsubstituted include an anthracenyl group, a methyl anthracenyl group, a dimethyl anthracenyl group, a trimethyl anthracenyl group, an ethyl anthracenyl group, a diethyl anthracenyl group, a triethyl anthracenyl group, a n-propylanthracenyl group, a di-n-propylanthracenyl group, a tri-n-propylanthracenyl group, a n-butylanthracenyl group, a di-n-butylanthracenyl group, a tri-n-butylanthracenyl group, a n-pentylanthracenyl group, a di-n-pentylanthracenyl group, a tri-n-pentylanthracenyl group, a n-hexylanthracenyl group, a di-n-hexylanthracenyl group, a tri-n-hexylanthracenyl group; a methoxyanthracenyl group, a dimethoxyanthracenyl group, a trimethoxyanthracenyl group, an ethoxyanthracenyl group, a diethoxyanthracenyl group, a triethoxyanthracenyl group, a n-propoxyanthracenyl group, a di-n-propoxyanthracenyl group, a tri-n-propoxyanthracenyl group, a n-butoxyanthracenyl group, a di-n-butoxyanthracenyl group, a tri-n-butoxyanthracenyl group, a n-pentyloxyanthracenyl group, a di-n-pentyloxyanthracenyl group, a tri-n-pentyloxyanthracenyl group, a n-hexyloxyanthracenyl group, a di-n-hexyloxyanthracenyl group, a tri-n-hexyloxyanthracenyl group; a vinyl anthracenyl group; a phenyl anthracenyl group; a phenoxyanthracenyl group; a fluoroanthracenyl group, a difluoroanthracenyl group, a trifluoroanthracenyl group, a tetrafluoroanthracenyl group, a perfluoroanthracenyl group, a chloroanthracenyl group, a dichloroanthracenyl group, a trichloroanthracenyl group, a tetrachloroanthracenyl group, a perchloroanthracenyl group, a bromoanthracenyl group, a dibromoanthracenyl group, a tribromoanthracenyl group, a tetrabromoanthracenyl group, a perbromoanthracenyl group, an iodoanthracenyl group, a diiodoanthracenyl group, a triiodoanthracenyl group, a tetraiodoanthracenyl group, a periodoanthracenyl group; a —$C_{14}H_8$—B(OMgCl)$_2$ group, and the like. Among these, an anthracenyl group; a methyl anthracenyl group, a dimethyl anthracenyl group, a trimethyl anthracenyl group, an ethyl anthracenyl group, a diethyl anthracenyl group, a triethyl anthracenyl group, a n-propylanthracenyl group, a di-n-propylanthracenyl group, a tri-n-propylanthracenyl group; a methoxyanthracenyl group, a dim ethoxyanthracenyl group, a trimethoxyanthracenyl group, an ethoxyanthracenyl group, a diethoxyanthracenyl group, a triethoxyanthracenyl group, a n-propoxyanthracenyl group, a di-n-propoxyanthracenyl group, a tri-n-propoxyanthracenyl group; a phenyl anthracenyl group; a phenoxyanthracenyl group; a fluoroanthracenyl group, a difluoroanthracenyl group, a trifluoroanthracenyl group; and a —$C_{14}H_8$—B(OMgCl)$_2$ group are preferable, and an anthracenyl group is more preferable.

In the heterocyclic group represented by $R^1$ which has a substituent or is unsubstituted, examples of a monocyclic heterocyclic group which does not have a substituent include 5- or 6-membered heterocyclic group containing a heteroatom such as a nitrogen atom, an oxygen atom, or a sulfur atom. The heterocyclic group has one to plural heteroatoms, preferably has one or two heteroatoms, and even more preferably has one heteroatom. As the heteroatom, an oxygen atom or a sulfur atom is preferable, and an oxygen atom is more preferable. Specific examples of such a heterocyclic group include a 5-membered heterocyclic group having one heteroatom such as furan, thiophene, pyrrole, 2H-pyrrole, 1-pyrroline, 2-pyrroline, 3-pyrroline, or pyrrolidine; a 5-membered heterocyclic group having two heteroatoms such as oxazole, isoxazole, thiazole, isothiazole, imidazole, pyrazole, imidazoline, imidazolidine, 1-pyrazoline, 2-pyrazoline, 3-pyrazoline, or pyrazolidine; a 5-membered heterocyclic group having three heteroatoms such as furazan, triazole, oxadiazole, or thiadiazole; a 5-membered heterocyclic group having four heteroatoms such as tetrazole; a 6-membered heterocyclic group having one heteroatom such as 2H-pyran, 4H-pyran, thiopyran, pyridine, or piperidine; a 6-membered heterocyclic group having two heteroatoms such as pyridazine, pyrimidine, pyrazine, piperazine, or morpholine; a 6-membered heterocyclic group having three heteroatoms such as triazine; and the like. Among the specific examples, a 5-membered heterocyclic group having one or two heteroatoms and a 6-membered heterocyclic group having one or two heteroatoms are preferable. Among these, a 5- or 6-membered unsaturated (double bond-containing) heterocyclic group having one or two heteroatoms is preferable, furan, thiophene, pyrrole, oxazole, isoxazole, thiazole, isothiazole, imidazole, pyrazole, pyridine, pyridazine, pyrimidine, and pyrazine are more preferable, furan, thiophene, pyrrole, and pyridine are particularly preferable, and furan is most preferable.

In a heterocyclic group represented by $R^1$ which has a substituent or is unsubstituted, examples of a bicyclic heterocyclic group which does not have a substituent include a bicyclic heterocyclic group in which monocyclic heterocyclic rings fused, a bicyclic heterocyclic group in which a monocyclic heterocyclic ring and benzene are fused, and the like. Specifically, examples thereof include a heterocyclic group having one heteroatom such as benzofuran, isobenzofuran, 1-benzothiophene, 2-benzothiophene, indole, isoindole, indoline, isoindoline, indolizine, 2H-chromene, 4H-chromene, 1H-isochromene, 3H-isochromene, chromane, isochromane, quinoline, isoquinoline, or 4H-quinolidine; a heterocyclic group having two heteroatoms such as benzimidazole, benzothiazole, 1H-indazole, cinnoline, quinazoline, quinoxaline, 1,8-naphthyridine, or phthalazine; and the like. Among these, a bicyclic heterocyclic group in which a 5-membered monocyclic heterocyclic ring and benzene are fused is preferable, benzofuran, isobenzofuran, 1-benzothiophene, 2-benzothiophene, indole, and isoindole are more preferable, and benzofuran is particularly preferable.

Examples of a monocyclic or bicyclic heterocyclic group represented by $R^1$ which has a substituent or is unsubstituted include groups represented by general formulae (V), (VI), (VII), and (VIII). Among these, the groups represented by the general formulae (V), (VI), and (VIII) are preferable, the groups represented by the general formulae (V) are (VI) are more preferable, and the group represented by the general formula (V) is particularly preferable.

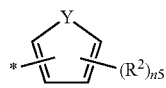

(V)

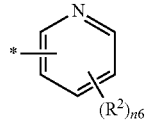

(VI)

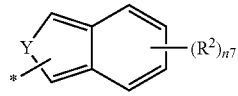

(VII)

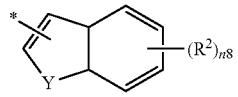

(VIII)

In the formulae, Y represents an oxygen atom, a sulfur atom, or a —$NR^5$— group ($R^5$ represents a hydrogen atom or an alkyl group having 1 to 6 carbon atoms), $n_5$ represents an integer of 0 to 3, $n_6$ represents an integer of 0 to 4, $n_7$ represents an integer of 0 to 5, $n_8$ represents an integer of 0 to 5, * represents a bond, and $R^2$ is the same as $R^2$ described above.

The Y represents an oxygen atom, a sulfur atom or a —$NR^5$— group ($R^5$ represents a hydrogen atom or an alkyl group having 1 to 6 carbon atoms). Among these, an oxygen atom and a sulfur atom are preferable, and an oxygen atom is more preferable.

The $n_5$ represents an integer of 0 to 3. The $n_5$ is preferably an integer of 0 to 2, and more preferably 0.

The $n_6$ represents an integer of 0 to 4. The $n_6$ is preferably an integer of 0 to 2, and more preferably 0.

The $n_7$ represents an integer of 0 to 5. The $n_7$ is preferably an integer of 0 to 2, and more preferably 0.

The $n_8$ represents an integer of 0 to 5. The $n_8$ is preferably an integer of 0 to 2, and more preferably 0.

Specific examples and preferred examples of an alkyl group having 1 to 6 carbon atoms in —$NR^5$— represented by Y are the same as the specific examples of the alkyl group having 1 to 6 carbon atoms represented by $R^1$.

Specific examples of groups preferred as an unsaturated (double bond-containing) heterocyclic group represented by the general formula (V) include the following groups (* represents a bond).

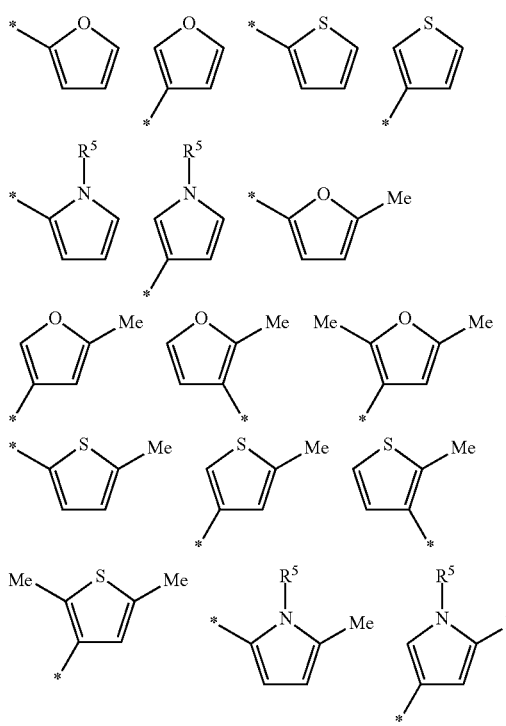

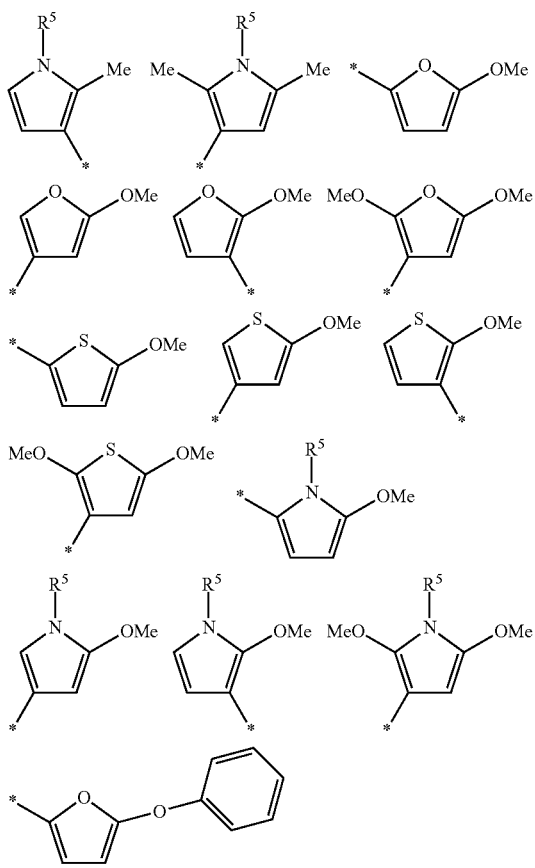

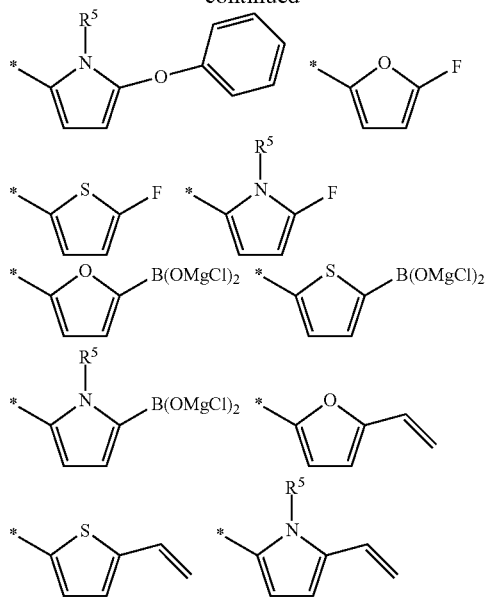

Among the specific examples, the following groups (* represents a bond) are preferable.

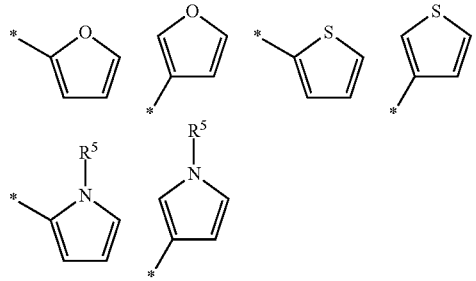

Specific examples of groups preferred as an unsaturated (double bond-containing) heterocyclic group represented by the general formula (VI) include the following groups (* represents a bond).

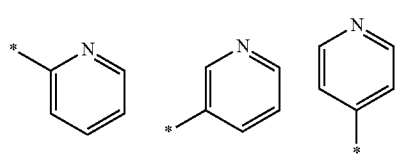

Specific examples of groups preferred as an unsaturated (double bond-containing) heterocyclic group represented by the general formula (VII) or (VIII) include the following groups (* represents a bond).

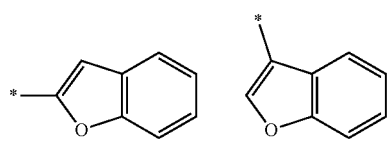

-continued

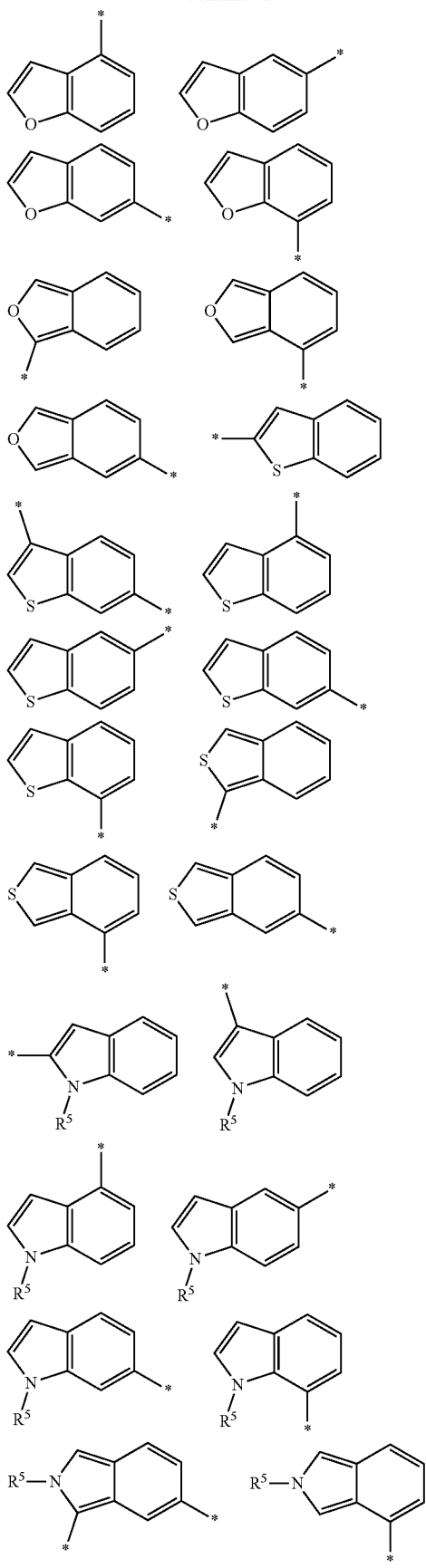

-continued

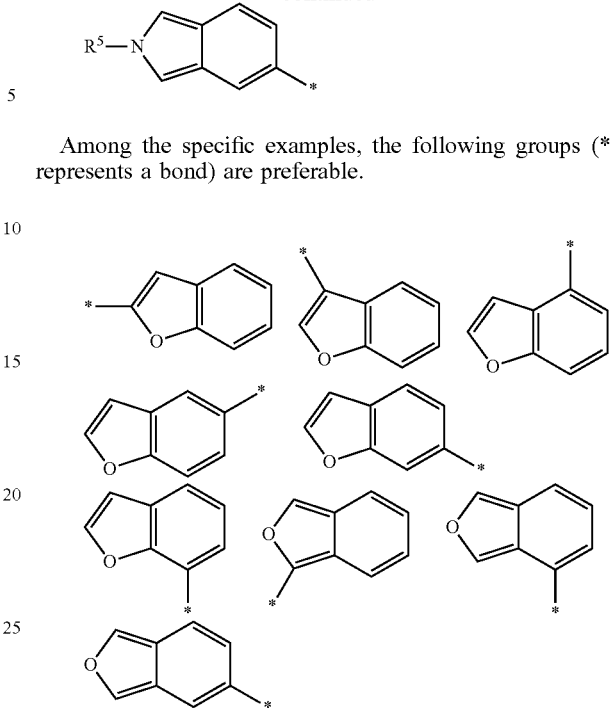

Among the specific examples, the following groups (* represents a bond) are preferable.

As $R^1$ in the general formula (I), among the specific examples, an alkyl group having 1 to 6 carbon atoms; an alkoxy group having 1 to 6 carbon atoms; a phenoxy group; a —OMgX group (X is the same as X described above); an aryl group having 6 to 18 carbon atoms represented by any of the general formulae (II) to (IV) which has a substituent or is unsubstituted; or a monocyclic or bicyclic heterocyclic group represented by any of the general formulae (V) to (VIII) which has a substituent or is unsubstituted is preferable. Among these, an alkyl group having 1 to 3 carbon atoms; an alkoxy group having 1 to 3 carbon atoms; a —OMgX group (X is the same as X described above); an aryl group having 6 carbon atoms represented by the general formula (II) which has a substituent or is unsubstituted; and a monocyclic heterocyclic group represented by the general formula (V) or (VI) which has a substituent or is unsubstituted are preferable, a —OMgX group (X is the same as X described above) and an aryl group having 6 carbon atoms represented by the general formula (II) which has a substituent or is unsubstituted are more preferable; and a —OMgX group (X is the same as X described above) is particularly preferable.

Specific examples of compounds preferred as a compound represented by the general formula (I) include compounds represented by the following general formulae (X) to (XVII).

(X)

In the formula, $R^4$ represents an alkyl group having 1 to 6 carbon atoms, an alkoxy group having 1 to 6 carbon atoms, a phenoxy group, or a —OMgX group (X is the same as X described above).

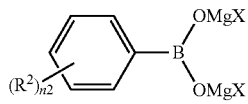
(XI)

In the formula, X, R², and n₂ are the same as X, R², and n₂ described above.

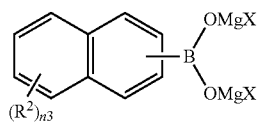
(XII)

In the formula, X, R², and n₃ are the same as X, R², and n₃ described above.

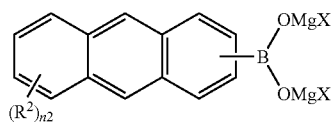
(XIII)

In the formula, X, R², and n₄ are the same as X, R², and n₄ described above.

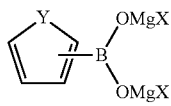
(XIV)

In the formula, X and Y are the same as X and Y described above.

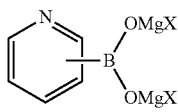
(XV)

In the formula, X is the same as X described above.

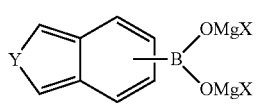
(XVI)

In the formula, X and Y are the same as X and Y described above.

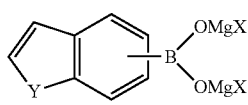
(XVII)

In the formula, X and Y are the same as X and Y described above.

Specific examples of compounds more preferred as a compound represented by the general formula (I) include the following compounds.

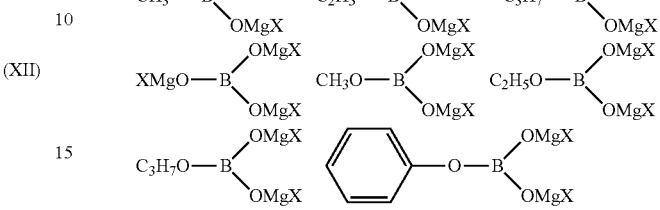

In the formulae, X is the same as X described above.

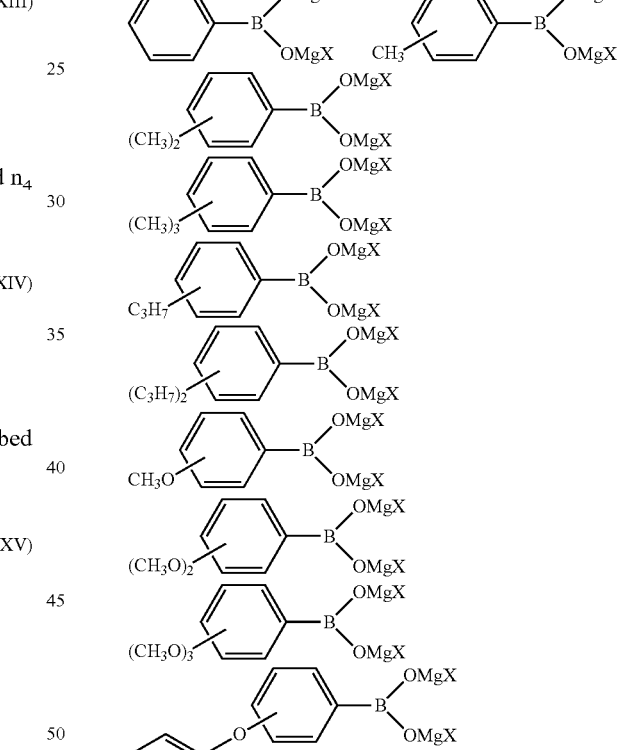

-continued

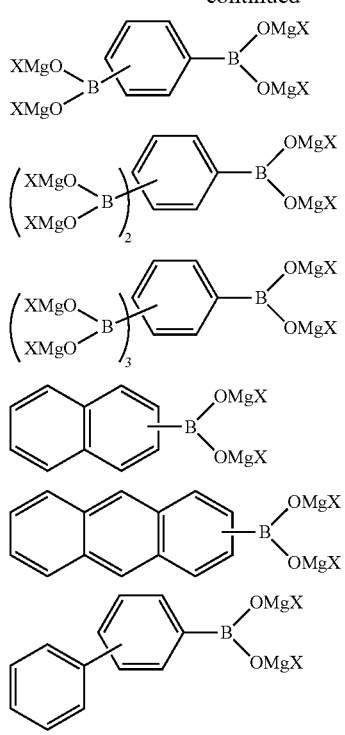

In the formulae, X is the same as X described above.

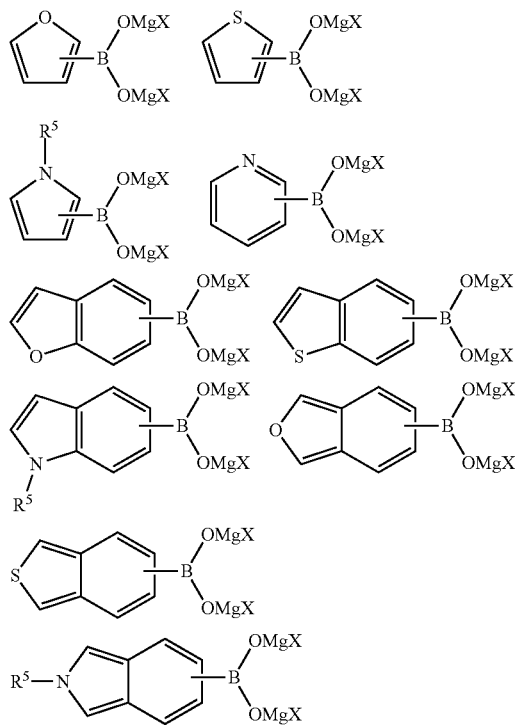

In the formulae, X and R⁵ are the same as X and R⁵ described above.

Among the specific examples, the following compounds (X is the same as X described above) are more preferable.

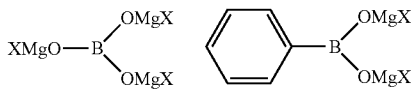

As a compound represented by the general formula (I), the following compound (X is the same as X described above) is particularly preferable.

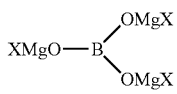

The compound represented by the general formula (I) forms a ligand in some cases. Specifically, in some cases, the compound represented by the general formula (I) forms a ligand together with a solvent according to the present invention that will be described later. For example, in a case where the compound represented by the general formula (I) forms a ligand together with tetrahydrofuran (THF), presumably, the following ligand may be formed. Furthermore, in some cases, the compound represented by the general formula (I) forms an aggregate in which a plurality of ligands are assembled.

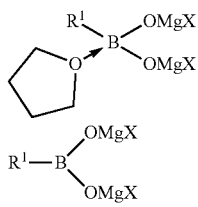

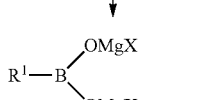

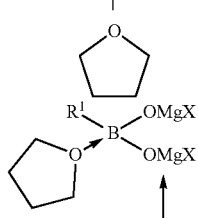

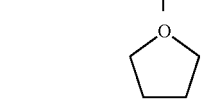

-continued

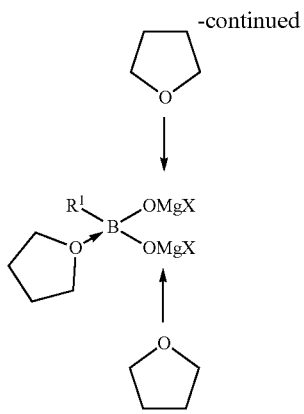

As the compound represented by the general formula (I), a commercial product or an appropriately synthesized compound may be used. In a case where the compound represented by the general formula (I) is synthesized, the following method is used.

—Method for Manufacturing Compound Represented by General Formula (I)—

The compound represented by the general formula (I) can be manufactured, for example, by reacting a boronic acid compound represented by the general formula (I') or boric acid [$B(OH)_3$] with a Grignard reagent in an appropriate solvent.

(I')

In the formula, $R^1$ is the same as $R^1$ described above.

As a boric acid, a commercial product may be used. In addition, as a boronic acid compound represented by the general formula (I'), a commercial product or a compound manufactured by a known method may be used.

Examples of Grignard reagent include a compound represented by $R^3MgX$ ($R^3$ represents an alkyl group having 1 to 6 carbon atoms; an aryl group having 6 to 18 carbon atoms that has, as a substituent, an alkyl group having 1 to 6 carbon atoms, an alkoxy group having 1 to 6 carbon atoms, a vinyl group, a phenyl group, a phenoxy group, a halogeno group, or a —$B(OMgX)_2$ group (X is the same as X described above) or is unsubstituted; or a monocyclic or bicyclic heterocyclic group which has, as a substituent, an alkyl group having 1 to 6 carbon atoms, an alkoxy group having 1 to 6 carbon atoms, a vinyl group, a phenyl group, a phenoxy group, a halogeno group, or a —$B(OMgX)_2$ group (X is the same as X described above) or is unsubstituted, and X is the same as X described above).

Specific examples and preferred specific examples of an alkyl group having 1 to 6 carbon atoms, an aryl group having 6 to 18 carbon atoms, and a heterocyclic group represented by $R^3$ in $R^3MgX$ are the same as the specific examples of the alkyl group having 1 to 6 carbon atoms, the aryl group having 6 to 18 carbon atoms, and the heterocyclic group represented by $R^1$.

Specific examples and preferred specific examples of an alkyl group having 1 to 6 carbon atoms, an alkoxy group having 1 to 6 carbon atoms, a halogeno group, and a —$B(OMgX)_2$ group which are substituents in the aryl group represented by $R^3$ which has a substituent or is unsubstituted or in the heterocyclic group represented by $R^3$ which has a substituent or is unsubstituted are the same as the specific examples of the alkyl group having 1 to 6 carbon atoms, the alkoxy group having 1 to 6 carbon atoms, the halogeno group, and the —$B(OMgX)_2$ group that are represented by $R^1$.

The amount of the Grignard reagent used in the reaction between the boronic acid compound represented by the general formula (I') and the Grignard reagent varies with the number of —$B(OH)_2$ groups in 1 mol of the boronic acid compound represented by the general formula (I'). In a case where the number of —$B(OH)_2$ groups is 1, the amount of the Grignard reagent used is generally 1 to 3 mol, and preferably 1.5 to 2.5 mol. In a case where the number of —$B(OH)_2$ groups is 2, the amount of the Grignard reagent used is generally 3 to 5 mol, and preferably 3.5 to 4.5 mol. In a case where the number of —$B(OH)_2$ groups is 3, the amount of the Grignard reagent used is generally 5 to 7 mol, and preferably 5.5 to 6.5 mol. In addition, the amount of the Grignard reagent used in the reaction between the boric acid and the Grignard reagent is generally 2 to 5 mol and preferably 2 to 4 mol with respect to 1 mol of the boric acid.

The reaction temperature for the reaction between the boronic acid compound represented by the general formula (I') or the boric acid and the Grignard reagent may be appropriately set within a range of −78° C. to 80° C., and the reaction time is generally 5 seconds to 5 hours. In addition, the reaction is preferably performed in the atmosphere of an inert gas such as argon or nitrogen, and more preferably performed in an argon atmosphere. The solvent used in the reaction between the boronic acid compound represented by the general formula (I') or the boric acid and the Grignard reagent may be a solvent which dissolves at least one of the boronic acid compound represented by the general formula (I') and the boric acid or the Grignard reagent. As the solvent, a solvent dissolving both of them is preferable. Specifically, examples thereof include an ether-based solvent such as diethyl ether, diglyme, triglyme, tetraglyme, tetrahydrofuran, 2-methyltetrahydrofuran, diisopropyl ether, or 1,2-dimethoxyethane, a hydrocarbon-based solvent such as hexane or heptane, and the like. Among these, tetrahydrofuran is preferable.

It should be noted that if necessary, the obtained reactant may be washed with an appropriate solvent such as diisopropyl ether.

Specifically, the compound represented by the general formula (I) is manufactured as below.

That is, in an argon gas atmosphere, the boronic acid compound represented by the general formula (I') or the boric acid is mixed with a solvent such as tetrahydrofuran. In a case where the boronic acid compound represented by the general formula (I') is used, the amount of the Grignard reagent used varies with the number of —$B(OH)_2$ groups in the compound. In a case where the number of —$B(OH)_2$ groups is 1, the amount of the Grignard reagent used is 1 to 3 mol; in a case where the number of —$B(OH)_2$ groups is 2, the amount of the Grignard reagent used is 3 to 5 mol; and in a case where the number of —$B(OH)_2$ groups is 3, the amount of the Grignard reagent used is 5 to 7 mol. A tetrahydrofuran solution, in which the Grignard reagent such as phenylmagnesium chloride is dissolved in the amount described above, or the like is added dropwise to the mixture and allowed to react for 5 seconds to 5 hours. In a case where the boric acid is used, a tetrahydrofuran solution, in which phenylmagnesium chloride is dissolved in an amount of 2 to 5 mol with respect to 1 mol of the boric acid, is added dropwise to the mixture and allowed to react for 5 seconds to 5 hours. If necessary, an operation of filtering, concentrating, or solidifying the reaction solution is performed, and the obtained crude product is washed with a solvent such as diisopropyl ether and dried, thereby manufacturing the compound represented by the general formula (I).

—Lewis Acid According to the Present Invention—

The Lewis acid according to the present invention is a substance which contains, as an element, beryllium (Be), boron (B), aluminum (Al), silicon (Si), tin (Sn), titanium (Ti), chromium (Cr), iron (Fe), or cobalt (Co). Specifically, examples thereof include a beryllium compound such as beryllium (II) fluoride, beryllium (II) chloride, or beryllium (II) bromide; a boron compound such as boron (III) fluoride, boron (III) chloride, boron (III) bromide, triphenylborane, triphenoxyborane, or phenyl dichloroborane; an aluminum compound such as aluminum (III) chloride, aluminum (III) bromide, aluminum (III) iodide, dimethyl aluminum chloride, diethyl aluminum chloride, methyl aluminum dichloride, ethyl aluminum dichloride, trimethyl aluminum, triethyl aluminum, or triphenyl aluminum; a silyl compound such as trimethylsilyl triflate, tert-butyldimethylsilyl triflate, triisopropylsilyl triflate, or trimethylsilyl iodide; a tin compound such as tin (II) chloride, tin (IV) chloride, tin (IV) bromide, or tin (II) triflate; a titanium compound such as titanium (IV) fluoride, titanium (IV) chloride, titanium (IV) bromide, or titanium (IV) iodide; a chromium compound such as chromium (II) fluoride, chromium (III) fluoride, chromium (II) chloride, chromium (III) chloride, chromium (II) bromide, chromium (III) bromide, chromium (II) iodide, or chromium (III) iodide; an iron compound such as iron (II) fluoride, iron (II) chloride, iron (III) chloride, iron (II) bromide, or iron (II) iodide; a cobalt compound such as cobalt (II) fluoride, cobalt (II) chloride, cobalt (II) bromide, or cobalt (II) iodide; and the like.

Among the Lewis acids, a boron compound and an aluminum compound are preferable, and an aluminum compound is more preferable. Specifically, boron (III) chloride, aluminum (III) chloride, dimethyl aluminum chloride, methyl aluminum dichloride, and the like are preferable, and aluminum (III) chloride is particularly preferable.

—Compound Represented by Formula (A) According to the Present Invention—

The compound represented by the general formula (A) of the present invention is a compound represented by the following formula;

$$Mg[N(SO_2R^6)_2]_2 \quad (A)$$

wherein four $R^6$'s each independently represent an alkyl group having 1 to 6 carbon atoms, a perfluoroalkyl group having 1 to 6 carbon atoms, a phenyl group, or a perfluorophenyl group.

As an alkyl group having 1 to 6 carbon atoms represented by $R^6$, an alkyl group having 1 to 3 carbon atoms is preferable. In addition, the alkyl group may be linear, branched, or cyclic. Among these, a linear alkyl group is preferable. Specific examples of such an alkyl group include a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, an isohexyl group, a sec-hexyl group, a tert-hexyl group, a 3-methylpentyl group, a 2-methylpentyl group, a 1,2-dimethylbutyl group, a cyclopentyl group, a cyclohexyl group, and the like. Among these, a linear alkyl group having 1 to 3 carbon atoms such as a methyl group, an ethyl group, or a n-propyl group is preferable, and a methyl group is more preferable.

As a perfluoroalkyl group having 1 to 6 carbon atoms represented by $R^6$, a perfluoroalkyl group having 1 to 3 carbon atoms is preferable. In addition, the perfluoroalkyl group may be linear, branched, or cyclic. Among these, a linear perfluoroalkyl group is preferable. Specific examples of such a perfluoroalkyl group include a trifluoromethyl group, a pentafluoroethyl group, a heptafluoro-n-propyl group, a heptafluoroisopropyl group, a perfluoro-n-butyl group, a perfluoroisobutyl group, a perfluoro-sec-butyl group, a perfluoro-tert-butyl group, a perfluoro-n-pentyl group, a perfluoroisopentyl group, a perfluoro-sec-pentyl group, a perfluoro-tert-pentyl group, a perfluoroneopentyl group, a perfluoro-n-hexyl group, a perfluoroisohexyl group, a perfluoro-sec-hexyl group, a perfluoro-tert-hexyl group, a perfluoro-3-methylpentyl group, a perfluoro-2-methylpentyl group, a perfluoro-1,2-dimethylbutyl group, a perfluorocyclopentyl group, a perfluorocyclohexyl group, and the like. Among these, a linear perfluoroalkyl group having 1 to 3 carbon atoms such as a trifluoromethyl group, a pentafluoroethyl group, or a heptafluoro-n-propyl group is preferable, and a trifluoromethyl group is more preferable.

All of four $R^6$'s may be the same groups or different groups. It is preferable that all of four $R^6$'s are the same groups.

As $R^6$ in the general formula (A), among the specific examples, an alkyl group having 1 to 6 carbon atoms and a perfluoroalkyl group having 1 to 6 carbon atoms are preferable, a perfluoroalkyl group having 1 to 6 carbon atoms is more preferable, a linear perfluoroalkyl group having 1 to 3 carbon atoms such as a trifluoromethyl group, a pentafluoroethyl group, or a heptafluoro-n-propyl group is even more preferable, and a trifluoromethyl group is particularly preferable.

Specific examples of the compound represented by the general formula (A) include magnesium bis(alkanesulfonyl)imide having 2 to 12 carbon atoms such as magnesium bis(methanesulfonyl)imide, magnesium bis(ethanesulfonyl)imide, magnesium bis(n-propanesulfonyl)imide, magnesium bis(isopropanesulfonyl)imide, magnesium bis(n-butanesulfonyl)imide, magnesium bis(isobutanesulfonyl)imide, magnesium bis(sec-butanesulfonyl)imide, magnesium bis(tert-butanesulfonyl)imide, magnesium bis (n-pentanesulfonyl)imide, magnesium bis(isopentanesulfonyl)imide, magnesium bis(sec-pentanesulfonyl)imide, magnesium bis(tert-pentanesulfonyl)imide, magnesium bis (neopentanesulfonyl)imide, magnesium bis(n-hexanesulfonyl)imide, magnesium bis(isohexanesulfonyl) imide, magnesium bis(sec-hexanesulfonyl)imide, magnesium bis(tert-hexanesulfonyl)imide, magnesium bis (3-methylpentanesulfonyl)imide, magnesium bis(2-methylpentanesulfonyl)imide, magnesium bis(1,2-dimethylbutanesulfonyl)imide, magnesium bis(cyclopentanesulfonyl) imide, or magnesium bis(cyclohexanesulfonyl)imide; magnesium bis(perfluoroalkanesulfonyl)imide having 2 to 12 carbon atoms such as magnesium bis(trifluoromethanesulfonyl)imide, magnesium bis (pentafluoroethanesulfonyl) imide, magnesium bis(heptafluoro-n-propanesulfonyl) imide, magnesium bis(heptafluoroisopropanesulfonyl) imide, magnesium bis(perfluoro-n-butanesulfonyl)imide, magnesium bis(perfluoroisobutanesulfonyl)imide, magnesium bis(perfluoro-sec-butanesulfonyl)imide, magnesium bis(perfluoro-tert-butanesulfonyl)imide, magnesium bis (perfluoro-n-pentanesulfonyl)imide, magnesium bis(perfluoroisopentanesulfonyl)imide, magnesium bis(perfluoro-sec-pentanesulfonyl)imide, magnesium bis(perfluoro-tertpentanesulfonyl)imide, magnesium bis(perfluoroneopentanesulfonyl)imide, magnesium bis(perfluoro-n-hexanesulfonyl)imide, magnesium bis(perfluoroisohexanesulfonyl)imide, magnesium bis(perfluoro-sec-hexanesulfonyl)imide, magnesium bis(perfluoro-tert-hexanesulfonyl)imide, magnesium bis(perfluoro-3-methylpentanesulfonyl)imide, magnesium bis(perfluoro-2-methylpentanesulfonyl)imide, magnesium bis(perfluoro-1,2-dimethylbutanesulfonyl)imide, magnesium bis(perfluorocyclopentanesulfonyl)imide, or magnesium bis(perfluorocyclohexanesulfonyl)imide; magnesium bis(phenylsulfonyl)imide; magnesium bis(perfluorophenylsulfonyl)imide; and the like.

Among the specific examples, magnesium bis(alkanesulfonyl)imide having 2 to 12 carbon atoms and magnesium bis(perfluoroalkanesulfonyl)imide having 2 to 12 carbon atoms are preferable, and magnesium bis(perfluoroalkanesulfonyl)imide having 2 to 12 carbon atoms is more preferable. Among these, for example, linear magnesium bis(perfluoroalkanesulfonyl)imide having 2 to 6 carbon atoms such as magnesium bis(trifluoromethanesulfonyl)imide, magnesium bis(pentafluoroethanesulfonyl)imide, or magnesium bis(heptafluoro-n-propanesulfonyl)imide is even more preferable, and the magnesium bis(trifluoromethanesulfonyl)imide is particularly preferable.

—Solvent According to the Present Invention—

As a solvent according to the present invention, a solvent dissolving the mixture of the compound represented by the general formula (I) and the Lewis acid or the compound represented by the general formula (A) is preferable. Examples of such a solvent include an ether-based solvent, a halogenated hydrocarbon-based solvent, a carbonate-based solvent, a nitrile-based solvent, a sulfone-based solvent, and the like.

Examples of the ether-based solvent include diethyl ether, diglyme, triglyme, tetraglyme, tetrahydrofuran, 2-methyltetrahydrofuran, diisopropyl ether, 1,2-dimethoxyethane, cyclopentyl methyl ether, n-butylmethylether, tert-butylmethylether, 1,4-dioxane, and the like. Examples of the halogenated hydrocarbon-based solvent include dichloromethane, chloroform, carbon tetrachloride, 1,2-dichloroethane, and the like. Examples of the carbonate-based solvent include dimethyl carbonate, diethyl carbonate, ethyl methyl carbonate, propylene carbonate, and the like. Examples of the nitrile-based solvent include acetonitrile, propionitrile, butyronitrile, succinonitrile, pimelonitrile, 3-methoxypropionitrile, and the like. Examples of the sulfone-based solvent include sulfone, dimethyl sulfone, ethyl methyl sulfone, methyl-n-propylsulfone, methyl isopropyl sulfone, n-butylmethylsulfone, isobutyl methyl sulfone, sec-butylmethylsulfone, tert-butylmethylsulfone, diethyl sulfone, ethyl-n-propylsulfone, ethyl isopropyl sulfone, n-butylethylsulfone, isobutyl ethyl sulfone, sec-butylethylsulfone, tert-butylethylsulfone, di-n-propylsulfone, diisopropyl sulfone, n-butyl-n-propylsulfone, di-n-butylsulfone, and the like.

Among the specific examples, the ether-based solvent and the sulfone-based solvent are preferable, diglyme, triglyme, tetraglyme, tetrahydrofuran, 1,2-dimethoxyethane, n-butylmethylether, and sulfolane are preferable, and diglyme, triglyme, tetraglyme, and tetrahydrofuran are particularly preferable.

The solvent according to the present invention may be a mixed solvent obtained by mixing two or more kinds of the solvents, and is particularly preferably a mixed solvent obtained by mixing two or more kinds of ether-based solvents. Specific examples of such a mixed solvent include a mixed solvent of triglyme and tetrahydrofuran and the like.

—Electrolytic Solution for a Magnesium Battery of the Present Invention—

The electrolytic solution for a magnesium battery of the present invention is obtained by mixing the compound represented by the general formula (I) according to the present invention with the Lewis acid according to the present invention or the compound represented by the general formula (A) according to the present invention in the solvent according to the present invention.

The concentration of the compound represented by the general formula (I) in the electrolytic solution is generally 0.1 to 5 mol/L, preferably 0.1 to 3 mol/L, and more preferably 0.2 to 2 mol/L.

The amount of the Lewis acid used in the electrolytic solution for a magnesium battery of the present invention with respect to 1 mol of magnesium atom in the compound represented by the general formula (I) according to the present invention is generally 0.1 to 4 mol, and preferably 0.5 to 3 mol.

The amount of the compound represented by the general formula (A) used in the electrolytic solution for a magnesium battery of the present invention with respect to 1 mol of magnesium atom in the compound represented by the general formula (I) according to the present invention is generally 0.1 to 4 mol, and preferably 0.5 to 3 mol.

The Lewis acid and the compound represented by the general formula (A) may be used in combination in the electrolytic solution for a magnesium battery of the present invention. In a case where the Lewis acid and the compound represented by the general formula (A) are used in combination, the amount of the Lewis acid with respect to 1 mol of magnesium atom in the compound represented by the general formula (I) is generally 0.1 to 9 mol, and preferably 0.5 to 7 mol. In addition, in a case where the Lewis acid and the compound represented by the general formula (A) are used in combination, the amount of the compound represented by the general formula (A) with respect to 1 mol of magnesium atom in the compound represented by the general formula (I) according to the present invention is generally 0.1 to 4 mol, and preferably 0.5 to 3 mol.

The electrolytic solution for a magnesium battery of the present invention may contain additives generally used in the field of the related art, such as a film forming agent, an overcharging inhibitor, a deoxidizer, a dehydrating agent, and a flame retardant, coordinating additives such as a crown ether, and ionic additives such as lithium chloride, and tetrabutylammonium chloride.

The electrolytic solution for a magnesium battery of the present invention can be used in a magnesium battery. In a case where the electrolytic solution for a magnesium battery is used in magnesium secondary batteries, the electrolytic solution has high oxidative decomposition potential and can be stably repeatedly used.

The electrolytic solution for a magnesium battery of the present invention is manufactured by mixing together the compound represented by the general formula (I) with the Lewis acid or the compound represented by the general formula (A) in the solvent according to the present invention. More specifically, the electrolytic solution for a magnesium battery of the present invention is manufactured by using the Lewis acid generally in an amount of 0.1 to 4 mol or the compound represented by the general formula (A) generally in an amount of 0.1 to 4 mol with respect to 1 mol of magnesium atom in the compound represented by the general formula (I), adding the Lewis acid or the compound represented by the general formula (A) and the compound represented by the general formula (I) to the solvent according to the present invention such that the concentration of the compound represented by the general formula (I) becomes within the range of concentration described above, and mixing these together. It should be noted that, if necessary, at the time of mixing, the solvent (solution) may be heated or cooled to a temperature within a range of −78° C. to 300° C. Particularly, it is preferable that the solvent (solution) is heated or cooled to a temperature within a range of 0° C. to 150° C.

—Electrochemical Device of the Present Invention—

The electrochemical device of the present invention contains a positive electrode, a negative electrode, and the electrolytic solution for a magnesium battery of the present invention. Specific examples of the electrochemical device include a primary battery, a secondary battery, an air battery, an electric double-layer capacitor, and the like. Among these, the secondary battery is preferable. It should be noted that in the present invention, an electrochemical device in which a magnesium reaction occurs in a negative electrode is included in "magnesium battery" in the electrolytic solution for a magnesium battery of the present invention. The magnesium reaction mentioned in the present invention means the dissolution-precipitation of magnesium in the interface between metallic magnesium and an electrolytic solution, for example, the intercalation reaction of magnesium ions in a carbon-based material, a reaction in which an element such as bismuth and magnesium are alloyed, a reaction in which magnesium ions are occluded in•released from a battery material such as titanium oxide at a low potential such as a potential equal to or lower than 1 V, and the like.

The positive electrode in the electrochemical device of the present invention is not particularly limited as long as the positive electrode can contain magnesium or magnesium ions in the interior thereof or on the surface thereof and in the vicinity of the surface thereof. In addition, as long as the magnesium reaction occurs in the negative electrode, ions of a metal other than magnesium may be added such that the positive electrode can contain the ions of a metal other than magnesium in the interior thereof or on the surface thereof and in the vicinity of the surface thereof.

Specific examples of the positive electrode include cobalt, manganese, vanadium, aluminum, iron, silicon, phosphorus, nickel, molybdenum, titanium, tungsten, ruthenium, copper, chromium, lithium, sodium, potassium, rubidium, cesium, beryllium, calcium, strontium, barium, niobium, lanthanoids, carbon, sulfur, magnesium, platinum, hafnium, scandium, zirconium, osmium, iridium, gold, mercury, thallium, lead, tin, antimony; an oxide, a sulfide, a selenide, a telluride, a cyanide, a halide, a boride, a silicate, a phosphate, a borate, and a manganate of the above elements; an electrode containing a double salt of these as an active material; and the like. Among these, the molybdenum, the oxide, the sulfide, the selenide, the telluride, the cyanide, the halide, the boride, the silicate, the phosphate, the borate, and the manganate of the molybdenum, or the electrode containing a double salt of these as an active material is preferable.

It should be noted that the active material may be constituted with a combination of a plurality of metals and a plurality of compounds, may be doped with a metal such as magnesium or potassium, sulfur, boron, phosphate, or the like, and may be a hydrate.

These active materials may have any crystal system such as a tetragonal crystal, an orthorhombic crystal, or a hexagonal crystal. In addition, the crystal may form a structure such as a layered structure, a rutile structure, a spinel structure, an olivine structure, a Chevrel structure, an amorphous structure, or a crystal structure other than these. In addition, the crystal structure may be changed by a physical or chemical treatment or by the insertion and elimination of magnesium ions, and the change may be caused not to the entire structure but to a portion of the structure. Furthermore, the crystal structure may be changed such that the position of a peak is found to be changed in x-ray crystallography, or a treatment may be performed such that the change is confirmed by XPS.

Specific examples of inorganic active materials among these active materials include active materials constituted with $Mo_6S_8$, $V_2O_5$, $MnO_2$, $Mn_2O_3$, $Mn_3O_4$, $RuO_2$, $TiO_2$, $Co_3O_4$, $MoO_3$, $Co_3O_4$, $CoO$, $CoO_2$, $WO_3$, $PbO_2$, $Pb_3O_4$, $NiFe(CN)_6$, $CuFe(CN)_6$, $Ni[Fe(CN)_6]_{0.7}4.7H_2O$, $Cu[Fe(CN)_6]_{0.7}3.6H_2O$, $MgMo_6S_8$, $MgVPO_4F$, $MgFePO_4F$, $MgMnPO_4F$, $MgFePO_4$, $Mg_{0.1}V_2O_5$, $MgNiO_2$, $MgCoO_2$, $MgCo_2O_4$, $TiNb_2O_7$, $Mg_{0.5}Hf_{0.5}Sc_{1.0}(MoO_4)_3$, $MgZrWO_4$, $MgFe_2O_4$, $MgMn_2O_4$, $MgNi_2O_4$, $MgCr_2O_4$, $MgCoSiO_4$, $MgFeSiO_4$, $MgNiSiO_4$, $MgMnSiO_4$, $MgNi_{0.9}Mn_{0.1}SiO_4$, $MgVSiO_4$, $MgCuSiO_4$, $Mg_{1.03}Mn_{0.97}SiO_4$, $MgMnNiO_4$, $MgMn_{1.15}Ni_{0.6}Ti_{0.25}O_4$, $Mg_{0.75}Fe_{0.25}Ca(SiO_3)_2$, $Mg_{0.59}CO_{0.41}CaSiO$, $Mg_{0.71}Fe_{1.29}(SiO_3)_2$, $Mg_{1.88}Fe_{0.12}(SiO_3)_2$, $MgAg_{0.5}Fe_{0.95}Nb_{0.05}O_4$, $Mg_2SiO_4$, $KMnO_4$, $Mg(MnO_4)_2$, $NiCl_2$, $CoCl_2$, $FeCl_2$, $CrCl_2$, $FeF_3$, $MnF_3$, $LaF_3$, $NiS$, $FeS$, $CuS$, $CoS$, $ZrS_2$, $WS_2$, $CoS_2$, $MoS_2$, $MnS_2$, $NbS_2$, $NbS_3$, $TiS_2$, $TiB_2$, $ZrB_2$, $MoB_2$, $VS_2$, $WSe_2$, $Cu_2Se$, $Mo_9Se_{11}$, $NiSSe$, $VBO_3$, $TiBO_3$, $MnBO_3$, $CoBO_3$, $V_{0.5}Fe_{0.5}BO_3$, $V_{0.5}Ti_{0.5}BO_3$, $V_{0.5}Ti_{0.3}Fe_{0.2}BO_3$, and $V_2O_5.MgCl_2.P_2O_5$, a salt of a metal cation such as $Fe^{2+}$, $Cu^{2+}$, $Ti^{2+}$, or $Cd^{2+}$ and polysulfide, a complex of $Mg_2SiO_4$ or $TiNb_2O_7$ doped with boron (B) and a graphene, an active material having an amorphous structure synthesized from $KMnO_4$ and hydrochloric acid, a carbon complex of $MoS_2$ or $V_2O_5$, aerogel-type $V_2O_5$, nanowire-like $Mn_3O_4$, $MnO_2$ containing crystal water, porous $Mn_3O_4$ nanoparticles, nanotube-like $TiS_2$, K-$\alpha MnO_2$ doped with potassium, a Prussian blue analogue, and the like.

The positive electrode may contain, as an active material capable of occluding and storing magnesium or magnesium ions, sulfur; an organic sulfur compound; a radical compound; an organic compound; a polymer compound; a sulfur-containing polymer compound; a radical polymer; a functional compound; a material forming an electric double layer such as layered carbon, porous carbon, or activated carbon; and the like. These materials may be contained in the positive electrode in a state where magnesium is oxidized or in a state where sulfur, phosphorus, boron, and the like are mixed. Furthermore, these materials may be in a state where a portion thereof is halogenated.

Specific examples of organic active materials among these materials include Rubeanic acid, 2,5-dimercapto-1,3,4-thiadiazole (DMcT), trioxotriangulene, 2,2,6,6-tetramethylpiperidinyloxy (TEMPO), 4-hydroxy-2,2,6,6-tetramethyl-1-piperidinyloxy (4-hydroxy-TEMPO), dimethoxybenzoquinone (DMBQ), 9,10-anthraquinone, porphyrin, magnesium porphyrin, phthalocyanine, magnesium phthalocyanine, magnesium anthracene, polyaniline, a polyquinone derivative, a quinone-based polymer, poly(hydroquinonyl-benzoquinonyl sulfide), Carbyne polysulfide, poly-2,2'-dithiodianiline (PDTDA), poly(4-methacryloyloxy-2,2,6,6-tetramethylpiperidin-N-oxyl) (PTMA), poly(anthraquinonyl)sulfide, fullerene, S-BUMB18C6, S-UOEE, graphite fluoride, graphite fluoride mixed with copper, graphene fluoride, and the like.

The particle size, the surface area, and the like of the organic and inorganic active materials may be arbitrarily set and are not particularly limited.

The negative electrode in the electrochemical device of the present invention is not particularly limited as long as the negative electrode can contain magnesium or magnesium ions in the interior thereof or on the surface thereof and the vicinity of the surface thereof. Specific examples of the negative electrode include metallic magnesium enabling the dissolution•precipitation of magnesium, a magnesium alloy, a metal that can be alloyed with magnesium, a carbon material enabling the intercalation of magnesium or magnesium ions, a material capable of occluding•releasing magnesium ions at a low potential such as a potential equal to or lower than 1 V, and the like.

In addition, the electrochemical device of the present invention may further have a separator in addition to the positive electrode, the negative electrode, and the electrolytic solution for a magnesium battery of the present invention. The separator may be a substance which electrically insulates the positive electrode and the negative electrode from each other and through which magnesium ions pass. Examples thereof include a microporous polymer such as a porous polyolefin. Specific examples of the porous polyolefin include porous polyethylene, a polymer in which porous polyethylene and porous polypropylene are stacked to form multiple layers, and the like.

Hereinafter, the present invention will be more specifically described based on examples and comparative examples, but the present invention is not limited thereto.

EXAMPLES

Example 1: Preparation of Electrolytic Solution 1

(1) Synthesis of Magnesium Salt

In an argon gas atmosphere, 3.66 g (30 mmol) of phenylboronic acid (manufactured by Wako Pure Chemical Industries, Ltd.) was dissolved in 20 mL of tetrahydrofuran (THF) (manufactured by Wako Pure Chemical Industries, Ltd.), and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and 60 mL of diisopropyl ether (manufactured by Wako Pure Chemical Industries, Ltd.) was added thereto so as to generate powder. The powder was collected by filtration and dried, thereby obtaining a phenylboronic acid bis(magnesium chloride) salt (PhB(OMgCl)$_2$).

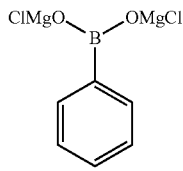

The result of $^1$H-NMR measured for PhB(OMgCl)$_2$ is shown below.

$^1$H-NMR (400 MHz, DMSO-d6) δ (ppm): 6.70-8.40 (m, 5H).

In addition, the result of $^1$H-NMR and IR measured for the phenylboronic acid is shown below.

$^1$H-NMR (400 MHz, DMSO-d6) δ (ppm): 7.30-7.45 (m, 3H, Ar), 7.75-7.85 (d, 2H, J=7.3 Hz, Ar), 8.02 (s, 2H, OH).

IR (ATR): $v_{OH}$=3237.

From the result of NMR, it was confirmed that the obtained PhB(OMgCl)$_2$ is a structure different from phenylboronic acid. In addition, from the result of IR, it was confirmed that the OH bond of the phenylboronic acid has disappeared in the PhB(OMgCl)$_2$.

Furthermore, through ICP-AES measurement, it was confirmed that the element ratio of PhB(OMgCl)$_2$ is Mg:B:Cl=2:1:2.

(2) Preparation of Electrolytic Solution

In an argon gas atmosphere, 1.20 g (5 mmol) of the phenylboronic acid bis(magnesium chloride) salt (PhB(OMgCl)$_2$) obtained in (1) was added to 20 mL of THF, the mixture was heated to 50° C., and then 1.00 g (7.5 mmol) of aluminum chloride (AlCl$_3$) (manufactured by Wako Pure Chemical Industries, Ltd) was added thereto. The reaction mixture was kept at 50° C. for 20 minutes and then cooled and filtered, thereby obtaining an electrolytic solution 1 [phenylboronic acid bis(magnesium chloride) salt (PhB(OMgCl)$_2$)-aluminum chloride/THF solution].

Example 2: Preparation of Electrolytic Solution 2

(1) Synthesis of Magnesium Salt

In an argon gas atmosphere, 4.50 g (30 mmol) of 2,6-dimethylphenylboronic acid (manufactured by Wako Pure Chemical Industries, Ltd.) was dissolved in 20 mL of THF, and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and the generated powder was washed with 50 mL of diisopropyl ether (manufactured by Wako Pure Chemical Industries, Ltd.). The powder was collected by filtration and dried, thereby obtaining a 2,6-dimethylphenylboronic acid bis(magnesium chloride) salt ((2,6-Me$_2$C$_6$H$_3$)B(OMgCl)$_2$).

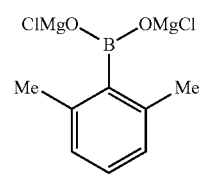

The result of $^1$H-NMR measured for the (2,6-Me$_2$C$_6$H$_3$)B(OMgCl)$_2$ is shown below.

$^1$H-NMR (400 MHz, DMSO-d6) δ (ppm): 2.10-2.50 (m, 6H, CH$_3$), 6.50-7.10 (m, 3H, Ar).

In addition, the result of $^1$H-NMR and IR measured for the 2,6-dimethylphenylboronic acid is shown below.

$^1$H-NMR (400 MHz, DMSO-d6) δ (ppm): 2.25 (s, 6H, CH$_3$), 6.88-6.93 (d, 2H, J=7.2 Hz, Ar), 7.02-7.09 (t, 1H, 7.2 Hz, Ar), 8.11 (s, 2H, OH).

IR (ATR): $v_{OH}$=3232.

From the result of NMR, it was confirmed that the obtained (2,6-Me$_2$C$_6$H$_3$)B(OMgCl)$_2$ is a structure different from the 2,6-dimethylphenylboronic acid. In addition, from the result of IR, it was confirmed that the OH bond of the 2,6-dimethylphenylboronic acid has disappeared in the (2,6-Me$_2$C$_6$H$_3$)B(OMgCl)$_2$.

Furthermore, through ICP-AES measurement, it was confirmed that the element ratio of (2,6-Me$_2$C$_6$H$_3$)B(OMgCl)$_2$ is Mg:B:Cl=2:1:2.

(2) Preparation of Electrolytic Solution

In an argon gas atmosphere, 1.34 g (5 mmol) of the 2,6-dimethylphenylboronic acid bis(magnesium chloride) salt (($2,6-Me_2C_6H_3$)$B(OMgCl)_2$) obtained in (1) was added to 20 mL of THF, the mixture was heated to 50° C., and then 1.33 g (10 mmol) of aluminum chloride ($AlCl_3$) (manufactured by Wako Pure Chemical Industries, Ltd) was added thereto. The reaction mixture was kept at 50° C. for 5 minutes and then cooled and filtered, thereby obtaining an electrolytic solution 2 [2,6-dimethylphenylboronic acid bis(magnesium chloride) salt (($2,6-Me_2C_6H_3$)$B(OMgCl)_2$)-aluminum chloride/THF solution].

Example 3: Preparation of Electrolytic Solution 3

(1) Synthesis of Magnesium Salt

In an argon gas atmosphere, 4.08 g (30 mmol) of 4-methylphenylboronic acid (manufactured by Wako Pure Chemical Industries, Ltd.) was dissolved in 20 mL of THF, and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and 50 mL of diisopropyl ether (manufactured by Wako Pure Chemical Industries, Ltd.) was added thereto so as to generate powder. The powder was collected by filtration and dried, thereby obtaining a 4-methylphenylboronic acid bis(magnesium chloride) salt (($4-MeC_6H_4$)$B(OMgCl)_2$).

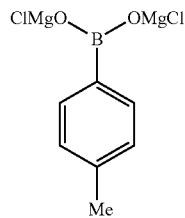

The result of $^1$H-NMR measured for the ($4-MeC_6H_4$)$B(OMgCl)_2$ is shown below.

$^1$H-NMR (400 MHz, DMSO-d6) δ (ppm): 2.00-2.50 (m, 3H, $CH_3$), 6.70-8.30 (m, 4H, Ar).

In addition, the result of $^1$H-NMR and IR measured for the 4-methylphenylboronic acid is shown below.

$^1$H-NMR (400 MHz, DMSO-d6) δ (ppm): 2.30 (s, 3H, $CH_3$), 7.12-7.16 (d, 2H, J=8.0 Hz, Ar), 7.65-7.71 (d, 2H, 8.0 Hz, Ar), 7.90 (s, 2H, OH).

IR (ATR): $v_{OH}$=3218.

From the result of NMR, it was confirmed that the obtained ($4-MeC_6H_4$)$B(OMgCl)_2$ is a structure different from the 4-methylphenylboronic acid. In addition, from the result of IR, it was confirmed that the OH bond of the 4-methylphenylboronic acid has disappeared in the ($4-MeC_6H_4$)$B(OMgCl)_2$.

Furthermore, through ICP-AES measurement, it was confirmed that the element ratio of ($4-MeC_6H_4$)$B(OMgCl)_2$ is Mg:B:Cl=2:1:2.

(2) Preparation of Electrolytic Solution

In an argon gas atmosphere, 1.27 g (5 mmol) of the 4-methylphenylboronic acid bis(magnesium chloride) salt (($4-MeC_6H_4$)$B(OMgCl)_2$) obtained in (1) was added to 20 mL of THF, the mixture was heated to 50° C., and then 1.00 g (7.5 mmol) of aluminum chloride ($AlCl_3$) (manufactured by Wako Pure Chemical Industries, Ltd) was added thereto. The reaction mixture was kept at 50° C. for 5 minutes and then cooled and filtered, thereby obtaining an electrolytic solution 3 [4-methylphenylboronic acid bis(magnesium chloride) salt (($4-MeC_6H_4$)$B(OMgCl)_2$)-aluminum chloride/THF solution].

Example 4: Preparation of Electrolytic Solution 4

(1) Synthesis of Magnesium Salt

In an argon gas atmosphere, 4.55 g (25 mmol) of 2,6-dimethoxyphenylboronic acid (manufactured by Wako Pure Chemical Industries, Ltd.) was dissolved in 25 mL of THF, and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and 25 mL of diisopropyl ether (manufactured by Wako Pure Chemical Industries, Ltd.) was added thereto so as to generate powder. The powder was collected by filtration and dried, thereby obtaining a 2,6-dimethoxyphenylboronic acid bis(magnesium chloride) salt (($2,6-(MeO)_2C_6H_3$)$B(OMgCl)_2$).

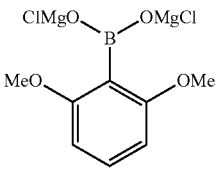

The result of $^1$H-NMR measured for the ($2,6-(MeO)_2C_6H_3$)$B(OMgCl)_2$ is shown below.

$^1$H-NMR (400 MHz, DMSO-d6) δ (ppm): 3.50-4.00 (m, 6H, $OCH_3$), 6.20-7.40 (m, 3H, Ar).

In addition, the result of $^1$H-NMR and IR measured for the 2,6-dimethoxyphenylboronic acid is shown below.

$^1$H-NMR (400 MHz, DMSO-d6) δ (ppm): 3.68 (s, 6H, $OCH_3$), 6.52-6.57 (d, 2H, J=8.4 Hz, Ar), 7.16-7.24 (t, 1H, 8.4 Hz, Ar), 7.81 (s, 2H, OH).

IR (ATR): $v_{OH}$=3317.

From the result of NMR, it was confirmed that the obtained ($2,6-(MeO)_2C_6H_3$)$B(OMgCl)_2$ is a structure different from the 2,6-dimethoxyphenylboronic acid. In addition, from the result of IR, it was confirmed that the OH bond of the 2,6-dimethoxyphenylboronic acid has disappeared in the ($2,6-(MeO)_2C_6H_3$)$B(OMgCl)_2$.

Furthermore, through ICP-AES measurement, it was confirmed that the element ratio of ($2,6-(MeO)_2C_6H_3$)$B(OMgCl)_2$ is Mg:B:Cl=2:1:2.

(2) Preparation of Electrolytic Solution

In an argon gas atmosphere, 1.50 g (5 mmol) of the 2,6-dimethoxyphenylboronic acid bis(magnesium chloride) salt (($2,6-(MeO)_2C_6H_3$)$B(OMgCl)_2$) obtained in (1) was added to 20 mL of THF, the mixture was heated to 50° C., and then 1.33 g (10 mmol) of aluminum chloride ($AlCl_3$) (manufactured by Wako Pure Chemical Industries, Ltd) was added thereto. The reaction mixture was kept at 50° C. for 5 minutes and then cooled and filtered, thereby obtaining an electrolytic solution 4 [2,6-dimethoxyphenylboronic acid bis(magnesium chloride) salt (($2,6-(MeO)_2C_6H_3$)$B(OMgCl)_2$)-aluminum chloride/THF solution].

Example 5: Preparation of Electrolytic Solution 5

(1) Synthesis of Magnesium Salt

In an argon gas atmosphere, 4.56 g (30 mmol) of 4-methoxyphenylboronic acid (manufactured by Wako Pure Chemical Industries, Ltd.) was dissolved in 20 mL of THF, and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and 60 mL of diisopropyl ether (manufactured by Wako Pure Chemical Industries, Ltd.) was added thereto so as to generate powder. The powder was collected by filtration and dried, thereby obtaining a 4-methoxyphenylboronic acid bis(magnesium chloride) salt ((4-(MeO)C$_6$H$_4$)B(OMgCl)$_2$).

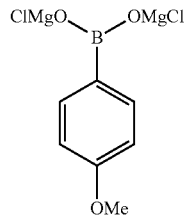

The result of $^1$H-NMR measured for the (4-(MeO)C$_6$H$_4$)B(OMgCl)$_2$ is shown below.

$^1$H-NMR (400 MHz, DMSO-d6) δ (ppm): 3.65-3.90 (m, 3H, OCH$_3$), 6.50-8.30 (m, 4H, Ar).

In addition, the result of $^1$H-NMR and IR measured for the 4-methoxyphenylboronic acid is shown below.

$^1$H-NMR (400 MHz, DMSO-d6) δ (ppm): 3.60-3.90 (m, 3H, OCH$_3$), 6.86-6.92 (d, 2H, J=8.8 Hz, Ar), 7.70-7.76 (d, 2H, 8.8 Hz, Ar), 7.82 (s, 2H, OH).

IR (ATR): ν$_{OH}$=3322.

From the result of NMR, it was confirmed that the obtained (4-(MeO)C$_6$H$_4$)B(OMgCl)$_2$ is a structure different from the 4-methoxyphenylboronic acid. In addition, from the result of IR, it was confirmed that the OH bond of the 4-methoxyphenylboronic acid has disappeared in the (4-(MeO)C$_6$H$_4$)B(OMgCl)$_2$.

Furthermore, through ICP-AES measurement, it was confirmed that the element ratio of (4-(MeO)C$_6$H$_4$)B(OMgCl)$_2$ is Mg:B:Cl=2:1:2.

(2) Preparation of Electrolytic Solution

In an argon gas atmosphere, 1.35 g (5 mmol) of the 4-methoxyphenylboronic acid bis(magnesium chloride) salt ((4-(MeO)C$_6$H$_4$)B(OMgCl)$_2$) obtained in (1) was added to 20 mL of THF, the mixture was heated to 50° C., and then 1.33 g (10 mmol) of aluminum chloride (AlCl$_3$) (manufactured by Wako Pure Chemical Industries, Ltd) was added thereto. The reaction mixture was kept at 50° C. for 5 minutes and then cooled and filtered, thereby obtaining an electrolytic solution 5 [4-methoxyphenylboronic acid bis(magnesium chloride) salt ((4-(MeO)C$_6$H$_4$)B(OMgCl)$_2$)-aluminum chloride/THF solution].

Example 6: Preparation of Electrolytic Solution 6

(1) Synthesis of Magnesium Salt

In an argon gas atmosphere, 4.74 g (30 mmol) of 2,6-difluorophenylboronic acid (manufactured by Wako Pure Chemical Industries, Ltd.) was dissolved in 20 mL of THF, and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and 55 mL of tert-butylmethylether (manufactured by Wako Pure Chemical Industries, Ltd.) was added thereto so as to generate powder. The powder was collected by filtration and dried, thereby obtaining a 2,6-difluorophenylboronic acid bis(magnesium chloride) salt ((2,6-F$_2$C$_6$H$_3$)B(OMgCl)$_2$).

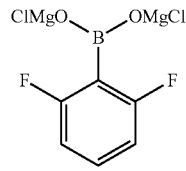

The result of $^1$H-NMR and $^{19}$F-NMR measured for the (2,6-F$_2$C$_6$H$_3$)B(OMgCl)$_2$ is shown below.

$^1$H-NMR (400 MHz, DMSO-d6) δ (ppm): 6.30-7.60 (m, 3H, Ar).

$^{19}$F-NMR (400 MHz, DMSO-d6) δ (ppm): −110.6−−109.6 (m, 2F).

In addition, the result of $^1$H-NMR, $^{19}$F-NMR, and IR measured for the 2,6-difluorophenylboronic acid is shown below.

$^1$H-NMR (400 MHz, DMSO-d6) δ (ppm): 6.94-7.02 (m, 2H, Ar), 7.35-7.45 (m, 1H, Ar), 8.68 (s, 2H, OH).

$^{19}$F-NMR (400 MHz, DMSO-d6) δ (ppm): −103.6−−102.7 (m, 2F).

IR (ATR): ν$_{OH}$=3320.

From the result of NMR, it was confirmed that the obtained (2,6-F$_2$C$_6$H$_3$)B(OMgCl)$_2$ is a structure different from the 2,6-difluorophenylboronic acid. In addition, from the result of IR, it was confirmed that the OH bond of the 2,6-difluorophenylboronic acid has disappeared in the (2,6-F$_2$C$_6$H$_3$)B(OMgCl)$_2$.

Furthermore, through ICP-AES measurement, it was confirmed that the element ratio of (2,6-F$_2$C$_6$H$_3$)B(OMgCl)$_2$ is Mg:B:Cl=2:1:2.

(2) Preparation of Electrolytic Solution

In an argon gas atmosphere, 1.38 g (5 mmol) of the 2,6-difluorophenylboronic acid bis(magnesium chloride) salt ((2,6-F$_2$C$_6$H$_3$)B(OMgCl)$_2$) obtained in (1) was added to 20 mL of THF, the mixture was heated to 50° C., and then 1.33 g (10 mmol) of aluminum chloride (AlCl$_3$) (manufactured by Wako Pure Chemical Industries, Ltd) was added thereto. The reaction mixture was kept at 50° C. for 5 minutes and then cooled and filtered, thereby obtaining an electrolytic solution 6 [2,6-difluorophenylboronic acid bis(magnesium chloride) salt ((2,6-F$_2$C$_6$H$_3$)B(OMgCl)$_2$)-aluminum chloride/THF solution].

Example 7: Preparation of Electrolytic Solution 7

(1) Synthesis of Magnesium Salt

In an argon gas atmosphere, 1.80 g (30 mmol) of methylboronic acid (manufactured by Wako Pure Chemical Industries, Ltd.) was dissolved in 20 mL of THF, and 2 M phenylmagnesium chloride (PhMgCl) solution in THF (manufactured by TOKYO CHEMICAL INDUSTRY CO., LTD.) 28.5 mL (57 mmol) was added dropwise thereto at −78° C. The solution was stirred for 30 minutes and then concentrated by heating, and the generated powder was washed with 50 mL of diisopropyl ether (manufactured by Wako Pure Chemical Industries, Ltd.). The powder was collected by filtration and dried, thereby obtaining a methylboronic acid bis(magnesium chloride) salt (MeB(OMgCl)$_2$).

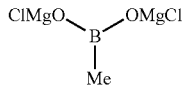

The result of $^1$H-NMR measured for the MeB(OMgCl)$_2$ is shown below.

$^1$H-NMR (400 MHz, DMSO-d6) δ (ppm): −0.40-0.40 (m, 3H, CH$_3$).

In addition, the result of $^1$H-NMR and IR measured for the methylboronic acid is shown below.

$^1$H-NMR (400 MHz, DMSO-d6) δ (ppm): 3.34 (s, 3H, CH$_3$), 7.41 (s, 2H, OH).

IR (ATR): ν$_{OH}$=3249.

From the result of NMR, it was confirmed that the obtained MeB(OMgCl)$_2$ is a structure different from the methylboronic acid. In addition, from the result of IR, it was confirmed that the OH bond of the methylboronic acid has disappeared in the MeB(OMgCl)$_2$.

Furthermore, through ICP-AES measurement, it was confirmed that the element ratio of MeB(OMgCl)$_2$ is Mg:B:Cl=2:1:2.

(2) Preparation of Electrolytic Solution

In an argon gas atmosphere, 0.89 g (5 mmol) of the methylboronic acid bis(magnesium chloride) salt (MeB(OMgCl)$_2$) obtained in (1) was added to 20 mL of THF, the mixture was heated to 50° C., and then 1.33 g (10 mmol) of aluminum chloride (AlCl$_3$) (manufactured by Wako Pure Chemical Industries, Ltd) was added thereto. The reaction mixture was kept at 50° C. for 5 minutes and then cooled and filtered, thereby obtaining an electrolytic solution 7 [methylboronic acid bis(magnesium chloride) salt (MeB(OMgCl)$_2$)-aluminum chloride/THF solution].

Example 8: Preparation of Electrolytic Solution 8

(1) Synthesis of Magnesium Salt

In an argon gas atmosphere, 1.24 g (20 mmol) of boric acid (manufactured by Wako Pure Chemical Industries, Ltd.) was dissolved in 10 mL of THF, and 2 M ethylmagnesium chloride (EtMgCl) solution in THF (manufactured by TOKYO CHEMICAL INDUSTRY CO., LTD.) 30.2 mL (60.4 mmol) was added dropwise thereto at room temperature. The solution was stirred for 30 minutes and then heated for concentration until the amount of the solution became 10 mL, and the generated powder was washed with a mixed solvent of 10 mL of THF and 40 mL of diisopropyl ether (manufactured by Wako Pure Chemical Industries, Ltd.). The powder was collected by filtration and dried, thereby obtaining magnesium borate trichloride (B(OMgCl)$_3$).

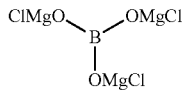

The result of $^1$H-NMR and IR measured for the boric acid is shown below.

$^1$H-NMR (400 MHz, DMSO-d6) δ (ppm): 5.88 (s, 3H, OH).

IR (ATR): ν$_{OH}$=3197.

From the result of NMR, it was confirmed that the obtained B(OMgCl)$_3$ is a structure different from the boric acid, because a signal resulting from the boric acid was not observed in $^1$H-NMR measured for the B(OMgCl)$_3$ by using DMSO-d6. In addition, from the result of IR, it was confirmed that the OH bond of the boric acid has disappeared in the B(OMgCl)$_3$.

Furthermore, through ICP-AES measurement, it was confirmed that the element ratio of B(OMgCl)$_3$ is Mg:B:Cl=3:1:3.

(2) Preparation of Electrolytic Solution

In an argon gas atmosphere, 2.38 g (10 mmol) of the magnesium borate trichloride (B(OMgCl)$_3$) obtained in (1) was added to 20 mL of triglyme (manufactured by Wako Pure Chemical Industries, Ltd.), the mixture was heated to 50° C., and then 8.00 g (60 mmol) of aluminum chloride (AlCl$_3$) (manufactured by Wako Pure Chemical Industries, Ltd) was added thereto. The reaction solution was heated and stirred for 3 days at 80° C., thereby obtaining a triglyme solution. The reaction mixture was cooled, 20 mL of triglyme was added thereto, and the solution was filtered, thereby obtaining an electrolytic solution 8 [magnesium borate trichloride (B(OMgCl)$_3$)-aluminum chloride/triglyme solution].

It should be noted that although the magnesium borate trichloride was considered to exhibit low solubility in an organic solvent, it was found that the magnesium borate trichloride can be dissolved in triglyme by the method described above.

Example 9: Preparation of Electrolytic Solution 9

In an argon gas atmosphere, 2.38 g (10 mmol) of the magnesium borate trichloride (B(OMgCl)$_3$) synthesized in Example 8 was added to 20 mL of triglyme (manufactured by Wako Pure Chemical Industries, Ltd.), the mixture was heated to 50° C., and then 8.00 g (60 mmol) of aluminum chloride (AlCl$_3$) (manufactured by Wako Pure Chemical Industries, Ltd.) was added thereto. The reaction mixture was heated and stirred for 3 days at 80° C. and cooled, 20 mL of THF was then added thereto, and the mixture was filtered, thereby obtaining an electrolytic solution 9 [magnesium borate trichloride (B(OMgCl)$_3$)-aluminum chloride/triglyme-THF mixed solution].

Example 10: Preparation of Electrolytic Solution 10

In an argon gas atmosphere, 0.48 g (2.0 mmol) of the magnesium borate trichloride (B(OMgCl)$_3$) synthesized in Example 8 was added to 16 mL of triglyme (manufactured by Wako Pure Chemical Industries, Ltd.), and 3.51 g (6.0 mmol) of magnesium bis(trifluoromethanesulfonyl)imide (Mg(TFSI)$_2$) (manufactured by Kishida Chemical Co., Ltd.) was added thereto. The reaction mixture was kept at 120° C. for 3 hours and then cooled and filtered, thereby obtaining an electrolytic solution 10 [magnesium borate trichloride (B(OMgCl)$_3$)—Mg(TFSI)$_2$/triglyme solution].

Example 11: Preparation of Electrolytic Solution 11

(1) Synthesis of Magnesium Salt

In an argon gas atmosphere, 3.44 g (20 mmol) of 1-naphthaleneboronic acid (manufactured by Wako Pure Chemical Industries, Ltd.) was dissolved in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 1-naphthaleneboronic acid bis(magnesium chloride) salt (1-($C_{10}H_7$)B($OMgCl)_2$).

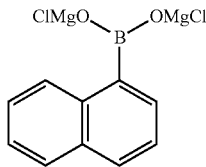

The result of $^1$H-NMR measured for the 1-($C_{10}H_7$)B($OMgCl)_2$ is shown below.
$^1$H-NMR (400 MHz, DMSO-d6) δ (ppm): 6.65-8.05 (m, 7H, Ar).
In addition, the result of $^1$H-NMR and IR measured for the 1-naphthaleneboronic acid is shown below.
$^1$H-NMR (400 MHz, DMSO-d6) δ (ppm): 7.45-7.62 (m, 3H, Ar), 7.71-7.75 (m, 1H, Ar), 7.83-7.80 (m, 3H, Ar), 8.32 (s, 2H, OH).
IR (ATR): $v_{OH}$=3225.
From the result of NMR, it was confirmed that the 1-($C_{10}H_7$)B($OMgCl)_2$ is a structure different from the 1-naphthaleneboronic acid. In addition, from the result of IR, it was confirmed that the OH bond of the 1-naphthaleneboronic acid has disappeared in the 1-($C_{10}H_7$)B($OMgCl)_2$.
Furthermore, through ICP-AES measurement, it was confirmed that the element ratio of 1-($C_{10}H_7$)B($OMgCl)_2$ is Mg:B=2:1.

(2) Preparation of Electrolytic Solution
In an argon gas atmosphere, 1.16 g (4.0 mmol) of the 1-naphthaleneboronic acid bis(magnesium chloride) salt (1-($C_{10}H_7$)B($OMgCl)_2$) obtained in (1) was added to 16 mL of triglyme (manufactured by Wako Pure Chemical Industries, Ltd.), and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 5 minutes and then cooled and filtered, thereby obtaining an electrolytic solution 11 [1-naphthaleneboronic acid bis(magnesium chloride) salt ((1-($C_{10}H_7$)B($OMgCl)_2$)-aluminum chloride/triglyme solution].

Example 12: Preparation of Electrolytic Solution 12

(1) Synthesis of Magnesium Salt
In an argon gas atmosphere, 4.44 g (20 mmol) of 9-anthraceneboronic acid (manufactured by Wako Pure Chemical Industries, Ltd.) was dissolved in 20 mL of THF, and 2 M phenylmagnesium chloride (PhMgCl) solution in THF (manufactured by TOKYO CHEMICAL INDUSTRY CO., LTD.) 20.0 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 9-anthraceneboronic acid bis(magnesium chloride) salt (9-($C_{14}H_9$)B($OMgCl)_2$).

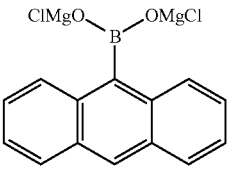

The result of $^1$H-NMR measured for the 9-($C_{14}H_9$)B($OMgCl)_2$ is shown below.
$^1$H-NMR (400 MHz, DMSO-d6) δ (ppm): 6.90-9.30 (m, 9H, Ar).
In addition, the result of $^1$H-NMR and IR measured for the 9-anthraceneboronic acid is shown below.
$^1$H-NMR (400 MHz, DMSO-d6) δ (ppm): 7.45-7.55 (m, 4H, Ar), 7.95-8.10 (m, 4H, Ar), 8.51 (s, 1H, Ar), 8.79 (s, 2H, OH).
IR (ATR): $v_{OH}$=3235.
From the result of NMR, it was confirmed that the obtained 9-($C_{14}H_9$)B($OMgCl)_2$ is a structure different from the 9-anthraceneboronic acid. In addition, from the result of IR, it was confirmed that the OH bond of the 9-anthraceneboronic acid has disappeared in the 9-($C_{14}H_9$)B($OMgCl)_2$.
Furthermore, through ICP-AES measurement, it was confirmed that the element ratio of the 9-($C_{14}H_9$)B($OMgCl)_2$ is Mg:B=2:1.

(2) Preparation of Electrolytic Solution
In an argon gas atmosphere, 1.36 g (4.0 mmol) of the 9-anthraceneboronic acid bis(magnesium chloride) salt (9-($C_{14}H_9$)B($OMgCl)_2$) obtained in (1) was added to 16 mL of THF, and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 10 minutes and then cooled and filtered, thereby obtaining an electrolytic solution 12 [9-anthraceneboronic acid bis(magnesium chloride) salt (9-($C_{14}H_9$)B($OMgCl)_2$)-aluminum chloride/THF solution].

Example 13: Preparation of Electrolytic Solution 13

(1) Synthesis of Magnesium Salt
In an argon gas atmosphere, 3.32 g (20 mmol) of 3-phenylenediboronic acid (manufactured by Wako Pure Chemical Industries, Ltd.) was suspended in 39 mL of THF, and 2 M phenylmagnesium chloride (PhMgCl) solution in THF (manufactured by TOKYO CHEMICAL INDUSTRY CO., LTD.) 40 mL (80 mmol) was added dropwise thereto at −78° C. The solution was stirred for 30 minutes and then concentrated by heating, and 35 mL of diisopropyl ether (manufactured by Wako Pure Chemical Industries, Ltd.) was added thereto so as to generate powder. The powder was collected by filtration and dried, thereby obtaining a 3-phenylenediboronic acid tetra(magnesium chloride) salt (3-($C_6H_4$)[B($OMgCl)_2]_2$).

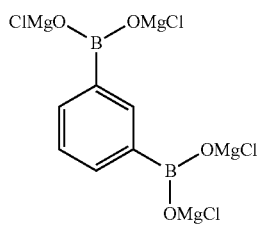

The result of $^1$H-NMR measured for the 3-(C$_6$H$_4$)[B(OMgCl)$_2$]$_2$ is shown below.

$^1$H-NMR (400 MHz, DMSO-d6) δ (ppm): 7.30-7.68 (m, 4H, Ar).

In addition, the result of $^1$H-NMR and IR measured for the 3-phenylenediboronic acid is shown below.

$^1$H-NMR (400 MHz, DMSO-d6) δ (ppm): 7.25-7.35 (m, 1H, Ar), 7.75-7.85 (m, 2H, Ar), 8.21 (s, 1H, Ar).

IR (ATR): $v_{OH}$=3284.

From the result of NMR, it was confirmed that the obtained 3-(C$_6$H$_4$)[B(OMgCl)$_2$]$_2$ is a structure different from the 3-phenylenediboronic acid. In addition, from the result of IR, it was confirmed that the OH bond of the 3-phenylenediboronic acid has disappeared in the 3-(C$_6$H$_4$)[B(OMgCl)$_2$]$_2$.

Furthermore, through ICP-AES measurement, it was confirmed that the element ratio of the 3-(C$_6$H$_4$)[B(OMgCl)$_2$]$_2$ is Mg:B=2:1.

(2) Preparation of Electrolytic Solution

In an argon gas atmosphere, 1.60 g (4.0 mmol) of the 3-phenylenediboronic acid tetra(magnesium chloride) salt (3-(C$_6$H$_4$)[B(OMgCl)$_2$]$_2$) obtained in (1) was added to 16 mL of triglyme (manufactured by Wako Pure Chemical Industries, Ltd.), and the mixture was heated to 50° C. Then, 2.13 g (16.0 mmol) of aluminum chloride (AlCl$_3$) (manufactured by Wako Pure Chemical Industries, Ltd.) was added thereto. The reaction mixture was kept at 50° C. for 5 minutes and then cooled and filtered, thereby obtaining an electrolytic solution 13 [3-phenylenediboronic acid tetra(magnesium chloride) salt (3-(C$_6$H$_4$)[B(OMgCl)$_2$]$_2$)-aluminum chloride/triglyme solution].

Example 14: Preparation of Electrolytic Solution 14

(1) Synthesis of Magnesium Salt

In an argon gas atmosphere, 3.32 g (20 mmol) of 4-phenylenediboronic acid (manufactured by Wako Pure Chemical Industries, Ltd.) was suspended in 39 mL of THF, and 2 M phenylmagnesium chloride (PhMgCl) solution in THF (manufactured by TOKYO CHEMICAL INDUSTRY CO., LTD.) 40 mL (80 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 4-phenylenediboronic acid tetra(magnesium chloride) salt (4-(C$_6$H$_4$)[B(OMgCl)$_2$]$_2$).

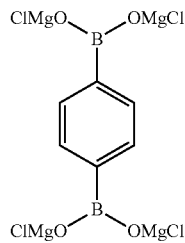

The result of $^1$H-NMR measured for the 4-(C$_6$H$_4$)[B(OMgCl)$_2$]$_2$ is shown below.

$^1$H-NMR (400 MHz, DMSO-d6) δ (ppm): 6.68-7.52 (m, 4H, Ar).

In addition, the result of $^1$H-NMR and IR measured for the 4-phenylenediboronic acid is shown below.

$^1$H-NMR (400 MHz, DMSO-d6) δ (ppm): 7.74 (s, 4H, Ar), 8.14 (s, 4H, OH).

IR (ATR): $v_{OH}$=3282.

From the result of NMR, it was confirmed that the obtained 4-(C$_6$H$_4$)[B(OMgCl)$_2$]$_2$ is a structure different from the 4-phenylenediboronic acid. In addition, from the result of IR, it was confirmed that the OH bond of the 4-phenylenediboronic acid has disappeared in the 4-(C$_6$H$_4$)[B(OMgCl)$_2$]$_2$.

Furthermore, through ICP-AES measurement, it was confirmed that the element ratio of the 4-(C$_6$H$_4$)[B(OMgCl)$_2$]$_2$ is Mg:B=2:1.

(2) Preparation of Electrolytic Solution

In an argon gas atmosphere, 1.60 g (4.0 mmol) of the 4-phenylenediboronic acid tetra(magnesium chloride) salt (4-(C$_6$H$_4$)[B(OMgCl)$_2$]$_2$) obtained in (1) was added to 16 mL of triglyme (manufactured by Wako Pure Chemical Industries, Ltd.), and the mixture was heated to 50° C. Then, 2.13 g (16.0 mmol) of aluminum chloride (AlCl$_3$) (manufactured by Wako Pure Chemical Industries, Ltd.) was added thereto. The reaction mixture was kept at 50° C. for 5 minutes and then cooled and filtered, thereby obtaining an electrolytic solution 14 [4-phenylenediboronic acid tetra(magnesium chloride) salt (4-(C$_6$H$_4$)[B(OMgCl)$_2$]$_2$)-aluminum chloride/triglyme solution].

Example 15: Preparation of Electrolytic Solution 15

(1) Synthesis of Magnesium Salt

In an argon gas atmosphere, 3.96 g (20 mmol) of 2-biphenylboronic acid (manufactured by Wako Pure Chemical Industries, Ltd.) was dissolved in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 2-biphenylboronic acid bis(magnesium chloride) salt ((2-(C$_6$H$_5$)C$_6$H$_4$)B(OMgCl)$_2$).

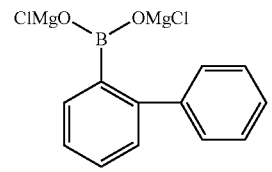

The result of $^1$H-NMR measured for the (2-(C$_6$H$_5$)C$_6$H$_4$)B(OMgCl)$_2$ is shown below.

$^1$H-NMR (400 MHz, DMSO-d6) δ (ppm): 6.90-7.72 (m, 9H, Ar).

In addition, the result of $^1$H-NMR and IR measured for the 2-biphenylboronic acid is shown below.

$^1$H-NMR (400 MHz, DMSO-d6) δ (ppm): 7.28-7.35 (m, 2H, Ar), 7.36-7.47 (m, 7H, Ar), 7.91 (s, 2H, OH).

IR (ATR): $v_{OH}$=3300.

From the result of NMR, it was confirmed that the obtained (2-(C$_6$H$_5$)C$_6$H$_4$)B(OMgCl)$_2$ is a structure different from the 2-biphenylboronic acid. In addition, from the result of IR, it was confirmed that the OH bond of the 2-biphenylboronic acid has disappeared in the (2-(C$_6$H$_5$)C$_6$H$_4$)B(OMgCl)$_2$.

Furthermore, through ICP-AES measurement, it was confirmed that the element ratio of the (2-($C_6H_5$)$C_6H_4$)B(OMgCl)$_2$ is Mg:B=2:1.

(2) Preparation of Electrolytic Solution

In an argon gas atmosphere, 1.26 g (4.0 mmol) of the 2-biphenylboronic acid bis(magnesium chloride) salt ((2-($C_6H_5$)$C_6H_4$)B(OMgCl)$_2$) obtained in (1) was added to 16 mL of triglyme (manufactured by Wako Pure Chemical Industries, Ltd.), and the mixture was heated to 50° C. Then, 1.07 g (8.0 mmol) of aluminum chloride (AlCl$_3$) (manufactured by Wako Pure Chemical Industries, Ltd.) was added thereto. The reaction mixture was kept at 50° C. for 5 minutes and then cooled, thereby obtaining an electrolytic solution 15 [2-biphenylboronic acid bis(magnesium chloride) salt ((2-($C_6H_5$)$C_6H_4$)B(OMgCl)$_2$)-aluminum chloride/triglyme solution].

Example 16: Preparation of Electrolytic Solution 16

(1) Synthesis of Magnesium Salt

In an argon gas atmosphere, 3.96 g (20 mmol) of 3-biphenylboronic acid (manufactured by Wako Pure Chemical Industries, Ltd.) was dissolved in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 3-biphenylboronic acid bis(magnesium chloride) salt ((3-($C_6H_5$)$C_6H_4$)B(OMgCl)$_2$).

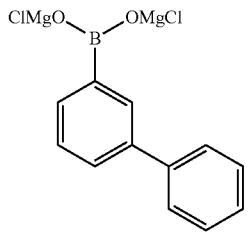

The result of $^1$H-NMR measured for the (3-($C_6H_5$)$C_6H_4$)B(OMgCl)$_2$ is shown below.

$^1$H-NMR (400 MHz, DMSO-d6) δ (ppm): 6.88-7.90 (m, 9H, Ar).

In addition, the result of $^1$H-NMR and IR measured for the 3-biphenylboronic acid is shown below.

$^1$H-NMR (400 MHz, DMSO-d6) δ (ppm): 7.32-7.40 (m, 1H, Ar), 7.42-7.52 (m, 4H, Ar), 7.66-7.72 (m, 3H, Ar), 7.77-7.79 (m, 1H, Ar), 8.12 (s, 2H, OH).

IR (ATR): $v_{OH}$=3220.

From the result of NMR, it was confirmed that the obtained (3-($C_6H_5$)$C_6H_4$)B(OMgCl)$_2$ is a structure different from the 3-biphenylboronic acid. In addition, from the result of IR, it was confirmed that the OH bond of the 3-biphenylboronic acid has disappeared in the (3-($C_6H_5$)$C_6H_4$)B(OMgCl)$_2$.

Furthermore, through ICP-AES measurement, it was confirmed that the element ratio of the (3-($C_6H_5$)$C_6H_4$)B(OMgCl)$_2$ is Mg:B=2:1.

(2) Preparation of Electrolytic Solution

In an argon gas atmosphere, 1.26 g (4.0 mmol) of the 3-biphenylboronic acid bis(magnesium chloride) salt ((3-($C_6H_5$)$C_6H_4$)B(OMgCl)$_2$) obtained in (1) was added to 16 mL of triglyme (manufactured by Wako Pure Chemical Industries, Ltd.), and the mixture was heated to 50° C. Then, 1.07 g (8.0 mmol) of aluminum chloride (AlCl$_3$) (manufactured by Wako Pure Chemical Industries, Ltd.) was added thereto. The reaction mixture was kept at 50° C. for 5 minutes and then cooled, thereby obtaining an electrolytic solution 16 [3-biphenylboronic acid bis(magnesium chloride) salt ((3-($C_6H_5$)$C_6H_4$)B(OMgCl)$_2$)-aluminum chloride/triglyme solution].

Example 17: Preparation of Electrolytic Solution 17

(1) Synthesis of Magnesium Salt

In an argon gas atmosphere, 4.28 g (20 mmol) of 4-phenoxyphenylboronic acid (manufactured by Wako Pure Chemical Industries, Ltd.) was dissolved in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 4-phenoxyphenylboronic acid bis(magnesium chloride) salt ((4-(PhO)$C_6H_4$)B(OMgCl)$_2$).

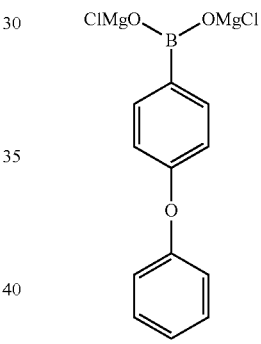

The result of $^1$H-NMR measured for the (4-(PhO)$C_6H_4$)B(OMgCl)$_2$ is shown below.

$^1$H-NMR (400 MHz, DMSO-d6) δ (ppm): 6.05-7.48 (m, 9H, Ar).

In addition, the result of $^1$H-NMR and IR measured for the 4-phenoxyphenylboronic acid is shown below.

$^1$H-NMR (400 MHz, DMSO-d6) δ (ppm): 6.93 (d, 2H, J=8.2 Hz, Ar), 7.01 (d, 2H, J=8.2 Hz, Ar), 7.16 (t, 1H, J=7.3 Hz, Ar), 7.35-7.45 (m, 2H, Ar), 7.80 (d, 2H, J=8.2 Hz, Ar), 7.97 (s, 2H, OH).

IR (ATR): $v_{OH}$=3260.

From the result of NMR, it was confirmed that the obtained (4-(PhO)$C_6H_4$)B(OMgCl)$_2$ is a structure different from the 4-phenoxyphenylboronic acid. In addition, from the result of IR, it was confirmed that the OH bond of the 4-phenoxyphenylboronic acid has disappeared in the (4-(PhO)$C_6H_4$)B(OMgCl)$_2$.

Furthermore, through ICP-AES measurement, it was confirmed that the element ratio of the (4-(PhO)$C_6H_4$)B(OMgCl)$_2$ is Mg:B=2:1.

(2) Preparation of Electrolytic Solution

In an argon gas atmosphere, 1.33 g (4.0 mmol) of the 4-phenoxyphenylboronic acid bis(magnesium chloride) salt ((4-(PhO)$C_6H_4$)B(OMgCl)$_2$) obtained in (1) was added to 16 mL of THF, and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 2 hours and then cooled and filtered, thereby obtaining an electrolytic solution 17 [4-phenoxyphenylboronic acid bis(magnesium chloride) salt (($4$-(PhO)$C_6H_4$)B(OMgCl)$_2$)-aluminum chloride/THF solution].

Example 18: Preparation of Electrolytic Solution 18

(1) Synthesis of Magnesium Salt

In an argon gas atmosphere, 2.24 g (20 mmol) of 3-furanboronic acid (manufactured by Wako Pure Chemical Industries, Ltd.) was dissolved in 39 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 3-furanboronic acid bis(magnesium chloride) salt (3-($C_4H_3O$)B(OMgCl)$_2$).

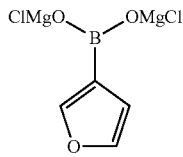

The result of $^1$H-NMR measured for the 3-($C_4H_3O$)B(OMgCl)$_2$ is shown below.

$^1$H-NMR (400 MHz, DMSO-d6) δ (ppm): 7.34-7.68 (m, 3H, Ar).

In addition, the result of $^1$H-NMR and IR measured for the 3-furanboronic acid is shown below.

$^1$H-NMR (400 MHz, DMSO-d6) δ (ppm): 6.63-6.65 (m, 1H, Ar), 7.61-7.63 (m, 1H, Ar), 7.83 (d, 1H, J=1.37 Hz, Ar).

IR (ATR): $v_{OH}$=3238.

From the result of NMR, it was confirmed that the obtained 3-($C_4H_3O$)B(OMgCl)$_2$ is a structure different from the 3-furanboronic acid. In addition, from the result of IR, it was confirmed that the OH bond of the 3-furanboronic acid has disappeared in the 3-($C_4H_3O$)B(OMgCl)$_2$.

Furthermore, through ICP-AES measurement, it was confirmed that the element ratio of the 3-($C_4H_3O$)B(OMgCl)$_2$ is Mg:B=2:1.

(2) Preparation of Electrolytic Solution

In an argon gas atmosphere, 0.92 g (4.0 mmol) of the 3-furanboronic acid bis(magnesium chloride) salt (3-($C_4H_3O$)B(OMgCl)$_2$) was added to 16 mL of triglyme (manufactured by Wako Pure Chemical Industries, Ltd.), and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 1 hour and then cooled and filtered, thereby obtaining an electrolytic solution 18 [3-furanboronic acid bis(magnesium chloride) salt (3-($C_4H_3O$)B(OMgCl)$_2$)-aluminum chloride/triglyme solution].

Example 19: Preparation of Electrolytic Solution 19

(1) Synthesis of Magnesium Salt

In an argon gas atmosphere, 3.24 g (20 mmol) of 2-benzofuranboronic acid (manufactured by TOKYO CHEMICAL INDUSTRY CO., LTD.) was suspended in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 2-benzofuranboronic acid bis(magnesium chloride) salt (2-($C_8H_5O$)B(OMgCl)$_2$).

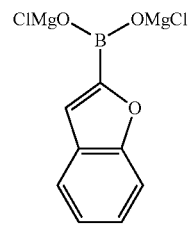

The result of $^1$H-NMR measured for the 2-($C_8H_5O$)B(OMgCl)$_2$ is shown below.

$^1$H-NMR (400 MHz, DMSO-d6) δ (ppm): 6.58-8.01 (m, 4H, Ar).

In addition, the result of $^1$H-NMR and IR measured for the 2-benzofuranboronic acid is shown below.

$^1$H-NMR (400 MHz, DMSO-d6) δ (ppm): 7.23 (t, 1H, J=7.8 Hz, Ar), 7.34 (t, 1H, J=7.8 Hz, Ar), 7.45 (s, 1H, Ar), 7.57 (d, 1H, J=7.8 Hz, Ar), 7.69 (d, 1H, J=7.8 Hz, Ar), 8.55 (br, 2H, OH).

IR (ATR): $v_{OH}$=3299.

From the result of NMR, it was confirmed that the obtained 2-($C_8H_5O$)B(OMgCl)$_2$ is a structure different from the 2-benzofuranboronic acid. In addition, from the result of IR, it was confirmed that the OH bond of the 2-benzofuranboronic acid has disappeared in the 2-($C_8H_5O$)B(OMgCl)$_2$.

Furthermore, through ICP-AES measurement, it was confirmed that the element ratio of the 2-($C_8H_5O$)B(OMgCl)$_2$ is Mg:B=2:1.

(2) Preparation of Electrolytic Solution

In an argon gas atmosphere, 1.12 g (4.0 mmol) of the 2-benzofuranboronic acid bis(magnesium chloride) salt (2-($C_8H_5O$)B(OMgCl)$_2$) obtained in (1) was added to 16 mL of triglyme (manufactured by Wako Pure Chemical Industries, Ltd.), and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 1 hour and then cooled and filtered, thereby obtaining an electrolytic solution 19 [2-benzofuranboronic acid bis(magnesium chloride) salt (2-($C_8H_5O$)B(OMgCl)$_2$)-aluminum chloride/triglyme solution].

Example 20: Preparation of Electrolytic Solution 20

(1) Synthesis of Magnesium Salt

In an argon gas atmosphere, 2.56 g (20 mmol) of 3-thiopheneboronic acid (manufactured by Wako Pure Chemical Industries, Ltd.) was dissolved in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78°

C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 3-thiopheneboronic acid bis(magnesium chloride) salt (3-$(C_4H_3S)B(OMgCl)_2$).

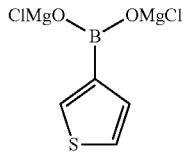

The result of $^1$H-NMR measured for the 3-$(C_4H_3S)B(OMgCl)_2$ is shown below.

$^1$H-NMR (400 MHz, DMSO-d6) δ (ppm): 6.67-7.56 (m, 4H, Ar).

In addition, the result of $^1$H-NMR and IR measured for the 3-thiopheneboronic acid is shown below.

$^1$H-NMR (400 MHz, DMSO-d6) δ (ppm): 7.40 (d, 1H, J=4.6 Hz, Ar), 7.47 (dd, 1H, J=2.7 Hz, 4.6 Hz, Ar), 7.90-8.00 (m, 3H, Ar, OH).

IR (ATR): $v_{OH}$=3225.

From the result of NMR, it was confirmed that the obtained 3-$(C_4H_3S)B(OMgCl)_2$ is a structure different from the 3-thiopheneboronic acid. In addition, from the result of IR, it was confirmed that the OH bond of the 3-thiopheneboronic acid has disappeared in the 3-$(C_4H_3S)B(OMgCl)_2$.

Furthermore, through ICP-AES measurement, it was confirmed that the element ratio of the 3-$(C_4H_3S)B(OMgCl)_2$ is Mg:B=2:1.

(2) Preparation of Electrolytic Solution

In an argon gas atmosphere, 0.98 g (4.0 mmol) of the 3-thiopheneboronic acid bis(magnesium chloride) salt (3-$(C_4H_3S)B(OMgCl)_2$) obtained in (1) was added to 16 mL of THF, and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 30 minutes and then cooled and filtered, thereby obtaining an electrolytic solution 20 [3-thiopheneboronic acid bis(magnesium chloride) salt (3-$(C_4H_3S)B(OMgCl)_2$)-aluminum chloride/THF solution].

Example 21: Preparation of Electrolytic Solution 21

(1) Synthesis of Magnesium Salt

In an argon gas atmosphere, 2.56 g (20 mmol) of 2-thiopheneboronic acid (manufactured by TOKYO CHEMICAL INDUSTRY CO., LTD.) was dissolved in 26 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 2-thiopheneboronic acid bis(magnesium chloride) salt (2-$(C_4H_3S)B(OMgCl)_2$).

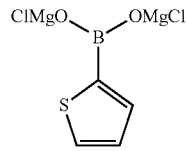

The result of $^1$H-NMR measured for the 2-$(C_4H_3S)B(OMgCl)_2$ is shown below.

$^1$H-NMR (400 MHz, DMSO-d6) δ (ppm): 6.53-8.04 (m, 4H, Ar).

In addition, the result of $^1$H-NMR and IR measured for the 2-thiopheneboronic acid is shown below.

$^1$H-NMR (400 MHz, DMSO-d6) δ (ppm): 7.17 (dd, 1H, J=4.6 Hz, 3.2 Hz, Ar), 7.67 (d, 1H, J=3.2 Hz, Ar), 7.73 (d, 1H, J=4.6 Hz, Ar).

IR (ATR): $v_{OH}$=3224.

From the result of NMR, it was confirmed that the obtained 2-$(C_4H_3S)B(OMgCl)_2$ is a structure different from the 2-thiopheneboronic acid. In addition, from the result of IR, it was confirmed that the OH bond of the 2-thiopheneboronic acid has disappeared in the 2-$(C_4H_3S)B(OMgCl)_2$.

Furthermore, through ICP-AES measurement, it was confirmed that the element ratio of the 2-$(C_4H_3S)B(OMgCl)_2$ is Mg:B=2:1.

(2) Preparation of Electrolytic Solution

In an argon gas atmosphere, 0.98 g (4.0 mmol) of the 2-thiopheneboronic acid bis(magnesium chloride) salt (2-$(C_4H_3S)B(OMgCl)_2$) obtained in (1) was added to 16 mL of triglyme (manufactured by Wako Pure Chemical Industries, Ltd.), and the mixture was heated to 50° C. Then, 1.07 g (8.0 mmol) of aluminum chloride ($AlCl_3$) (manufactured by Wako Pure Chemical Industries, Ltd.) was added thereto. The reaction mixture was kept at 50° C. for 2 hours and then cooled and filtered, thereby obtaining an electrolytic solution 21 [2-thiopheneboronic acid bis(magnesium chloride) salt (2-$(C_4H_3S)B(OMgCl)_2$)-aluminum chloride/triglyme solution].

Example 22: Preparation of Electrolytic Solution 22

(1) Synthesis of Magnesium Salt

In an argon gas atmosphere, 2.46 g (20 mmol) of 4-pyridineboronic acid (manufactured by Wako Pure Chemical Industries, Ltd.) was suspended in 39 mL of THF, and 2 M phenylmagnesium chloride (PhMgCl) solution in THF (manufactured by TOKYO CHEMICAL INDUSTRY CO., LTD.) 20 mL (40 mmol) was added dropwise thereto at −78° C. The solution was stirred for 30 minutes and then concentrated by heating, and 40 mL of diisopropyl ether (manufactured by Wako Pure Chemical Industries, Ltd.) was added thereto so as to generate powder. The powder was collected by filtration and dried, thereby obtaining a 4-pyridineboronic acid bis(magnesium chloride) salt (4-$(C_5H_4N)B(OMgCl)_2$).

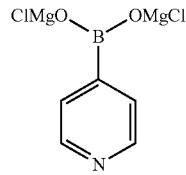

The result of $^1$H-NMR measured for the 4-(C$_5$H$_4$N)B(OMgCl)$_2$ is shown below.

$^1$H-NMR (400 MHz, DMSO-d6) δ (ppm): 6.32-8.68 (m, 4H, Ar).

In addition, the result of $^1$H-NMR and IR measured for the 4-pyridineboronic acid is shown below.

$^1$H-NMR (400 MHz, DMSO-d6) δ (ppm): 7.66 (d, 2H, J=5.5 Hz, Ar), 8.45 (s, 2H, OH), 8.55 (d, 2H, J=5.5 Hz, Ar).

IR (ATR): ν$_{OH}$=3297.

From the result of NMR, it was confirmed that the obtained 4-(C$_5$H$_4$N)B(OMgCl)$_2$ is a structure different from the 4-pyridineboronic acid. In addition, from the result of IR, it was confirmed that the OH bond of the 4-pyridineboronic acid has disappeared in the 4-(C$_5$H$_4$N)B(OMgCl)$_2$.

Furthermore, through ICP-AES measurement, it was confirmed that the element ratio of the 4-(C$_5$H$_4$N)B(OMgCl)$_2$ is Mg:B=2:1.

(2) Preparation of Electrolytic Solution

In an argon gas atmosphere, 0.96 g (4.0 mmol) of the 4-pyridineboronic acid bis(magnesium chloride) salt (4-(C$_5$H$_4$N)B(OMgCl)$_2$) obtained in (1) was added to 16 mL of THF, and the mixture was heated to 50° C. Then, 1.07 g (8.0 mmol) of aluminum chloride (AlCl$_3$) (manufactured by Wako Pure Chemical Industries, Ltd.) was added thereto. The reaction mixture was kept at 50° C. for 2 hours and then cooled and filtered, thereby obtaining an electrolytic solution 22 [4-pyridineboronic acid bis(magnesium chloride) salt (4-(C$_5$H$_4$N)B(OMgCl)$_2$)-aluminum chloride/THF solution].

Comparative Example 1: Preparation of Comparative Electrolytic Solution 1

(1) Synthesis of Diphenyl Borinic Acid

Diphenyl borinic acid was synthesized with reference to a literature (Org. Lett., 2009, 11, 5486).

That is, in a nitrogen atmosphere, 40 mL of acetone, 40 mL of methanol, and 18.0 g (80 mmol) of 2-aminoethyl diphenyl borinate (manufactured by TOKYO CHEMICAL INDUSTRY CO., LTD.) were put into a 500 mL flask and mixed together. Hydrochloric acid solution (1.0 M) 100 mL (100 mmol) was added dropwise thereto for 30 minutes and allowed to react for 1.5 hours at room temperature, and then 300 mL of diethyl ether (manufactured by Wako Pure Chemical Industries, Ltd.) was added thereto so as to cause liquid separation. Consecutively, the organic layer was washed twice with 100 mL of deionized water, and 30 g of magnesium sulfate (manufactured by Wako Pure Chemical Industries, Ltd.) was added thereto so as to dry the organic layer. The organic layer was filtered, concentrated and dried under reduced pressure, thereby obtaining a crude product of solid-state diphenyl borinic acid. n-Hexane (manufactured by Wako Pure Chemical Industries, Ltd.) 60 mL and dichloromethane (manufactured by Wako Pure Chemical Industries, Ltd.) 30 mL were added to the obtained crude product so as to cause precipitation. The precipitated solids were obtained by filtration and washed with 30 mL of n-hexane (manufactured by Wako Pure Chemical Industries, Ltd.). The white solids were air-dried for 2 hours, thereby obtaining 5.18 g (28.5 mmol, yield 36%, white solids) of diphenyl borinic acid.

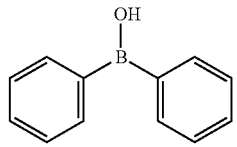 [SMILES: OB(c1ccccc1)c1ccccc1]

The result of $^1$H-NMR and IR measured for the diphenyl borinic acid is shown below.

$^1$H-NMR (400 MHz, DMSO-d6) δ (ppm): 7.39-7.44 (m, 4H, Ar), 7.44-7.49 (m, 2H, Ar), 7.69 (d, 4H, J=7.8 Hz, Ar), 9.96 (s, 1H, OH).

IR (ATR): ν$_{OH}$=3324.

(2) Synthesis of Magnesium Salt

In an argon gas atmosphere, 2.18 g (12 mmol) of the diphenylborinic acid obtained in (1) was dissolved in 20 mL, and 6.0 mL (12 mmol) of THF solution (manufactured by TOKYO CHEMICAL INDUSTRY CO., LTD.) containing phenyl magnesium chloride (PhMgCl) having a concentration of 2 M was added dropwise thereto at −78° C. The solution was stirred for 30 minutes and then heated for concentration until the amount of the solution became 8 mL, and 30 mL of diisopropyl ether (manufactured by Wako Pure Chemical Industries, Ltd.) was added thereto so as to generate powder. The powder was collected by filtration and dried, thereby obtaining magnesium chloride diphenylborinate (Ph$_2$B(OMgCl)).

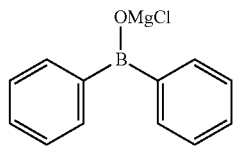

The result of $^1$H-NMR measured for the Ph$_2$B(OMgCl) is shown below.

$^1$H-NMR (400 MHz, DMSO-d6) δ (ppm): 6.65-7.33 (m, 10H).

From the result of NMR, it was confirmed that the obtained Ph$_2$B(OMgCl) is a structure different from the diphenyl borinic acid. In addition, from the result of IR, it was confirmed that the OH bond of the diphenylborinic acid has disappeared in the Ph$_2$B(OMgCl).

Furthermore, through ICP-AES measurement, it was confirmed that the element ratio of Ph$_2$B(OMgCl) is Mg:B:Cl=1:1:1.

(3) Preparation of Comparative Electrolytic Solution 1

In an argon gas atmosphere, 0.60 g (2.5 mmol) of the magnesium chloride diphenylborinate (Ph$_2$B(OMgCl)) obtained in (2) was mixed with 10 mL of THF, and the mixture was heated to 50° C. Then, 0.33 g (2.5 mmol) of aluminum chloride (AlCl$_3$) (manufactured by Wako Pure Chemical Industries, Ltd.) was added thereto. The reaction solution was kept at 50° C. for 5 minutes and then cooled and filtered, thereby obtaining a comparative electrolytic solution 1 [magnesium chloride diphenylborinate (Ph$_2$B(OMgCl))-aluminum chloride/THF solution].

Example 23/Comparative Example 2: Cyclic Voltammetry (CV) Measurement for Various Electrolytic Solutions By using the electrolytic solutions 1 to 22, cyclic voltammetry (CV) measurement was performed (Example 23). In addition, by using the comparative electrolytic solution 1, the CV measurement was performed (Comparative Example 2).

Specifically, the CV measurement was performed as below. That is, a three-electrode beaker cell was used, a platinum electrode (diameter 3 mm, manufactured by BAS Inc.) was used as a working electrode, a magnesium rod (diameter 1.6 mm, manufactured by The Nilaco Corporation) was used as a counter electrode, and a magnesium rod (diameter 1.6 mm, manufactured by The Nilaco Corporation) was used as a reference electrode. The electrolytic solution (2 mL) was put into the beaker, and the CV measurement was performed at room temperature (25° C.), at a scan rate of 5 mV/s between −1.5 V to 3.5 V. For the measurement, an electrochemical measurement system (manufactured by Bio-Logic Science Instruments) was used.

Table 1 shows the result of the oxidative decomposition potential (in the $10^{th}$ cycle) of each of the electrolytic solutions.

Figure 2:
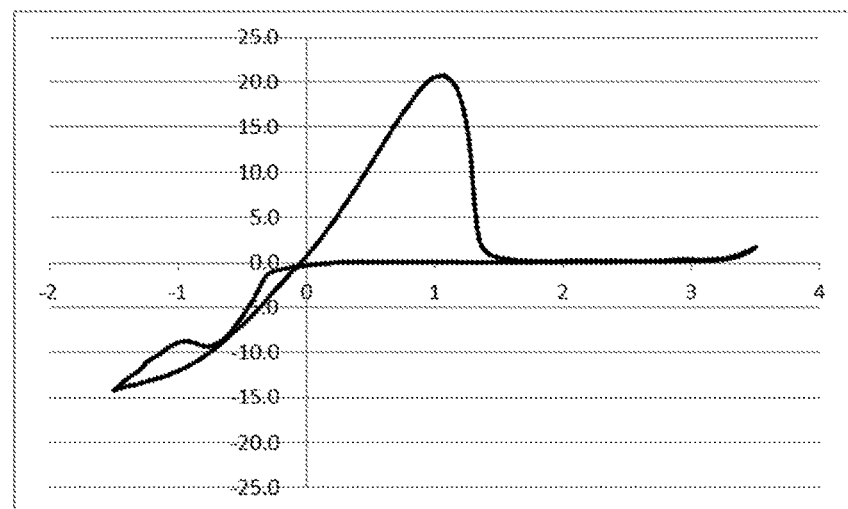
FIG. 2 shows a CV result obtained in the 10$^{th}$ cycle from an electrolytic solution 4 measured in Example 23.
Figure 3:
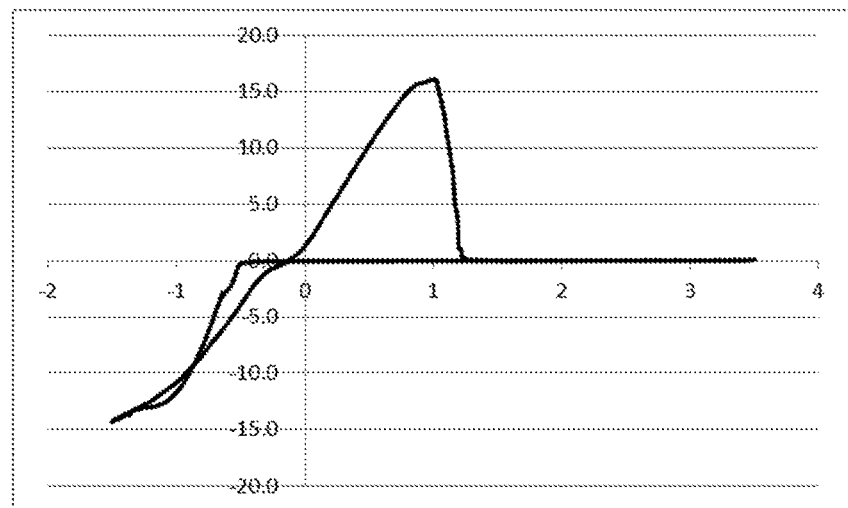
FIG. 3 shows a CV result obtained in the 10$^{th}$ cycle from an electrolytic solution 8 measured in Example 23.
Figure 4:
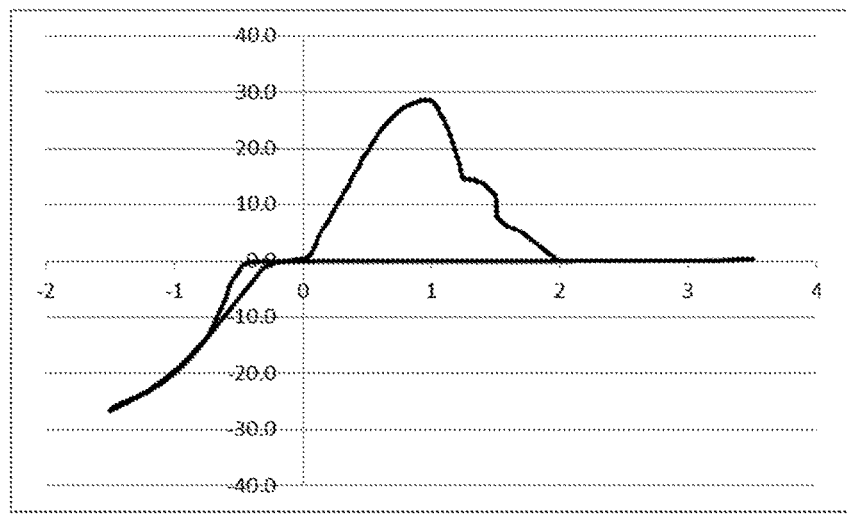
FIG. 4 shows a CV result obtained in the 10$^{th}$ cycle from an electrolytic solution 9 measured in Example 23.
Figure 5:
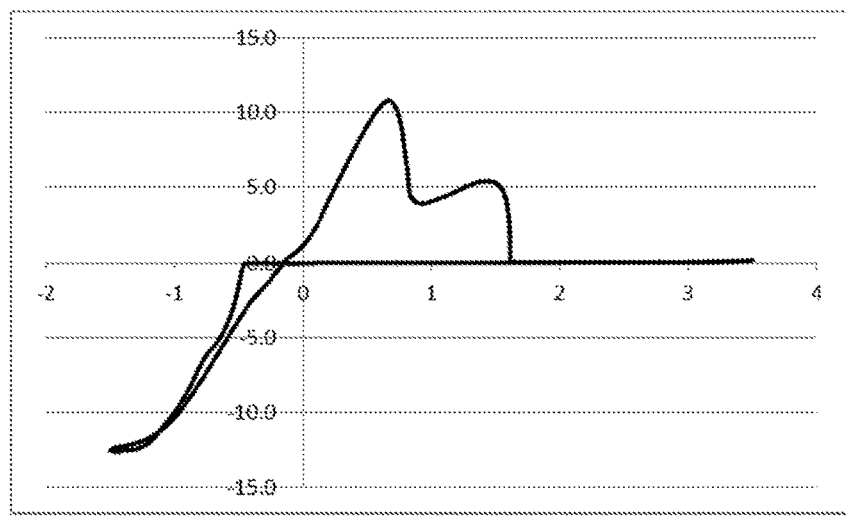
FIG. 5 shows a CV result obtained in the 10$^{th}$ cycle from an electrolytic solution 10 measured in Example 23.
Figure 6:
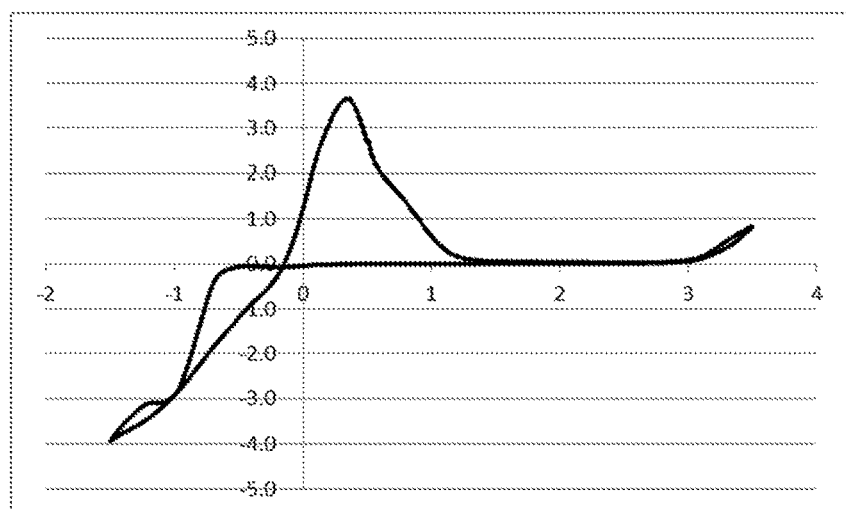
FIG. 6 shows a CV result obtained in the 10$^{th}$ cycle from an electrolytic solution 12 measured in Example 23.
Figure 7:
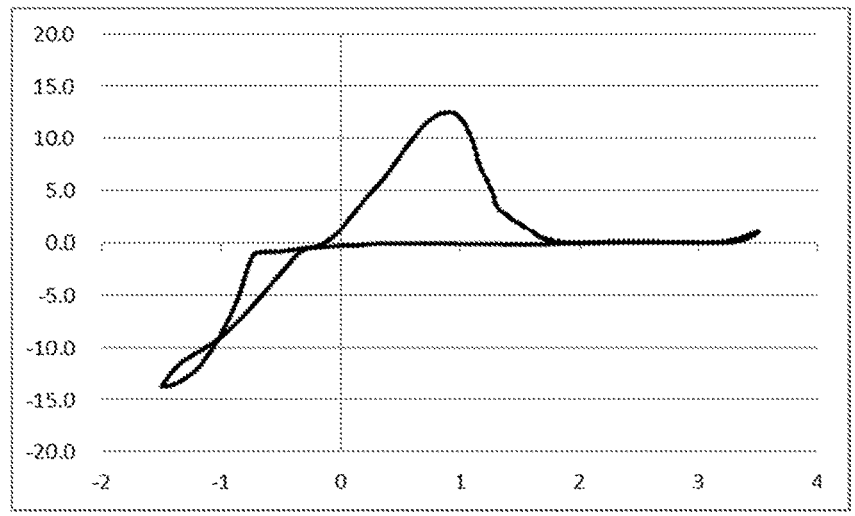
FIG. 7 shows a CV result obtained in the 10$^{th}$ cycle from an electrolytic solution 13 measured in Example 23.
Figure 8:
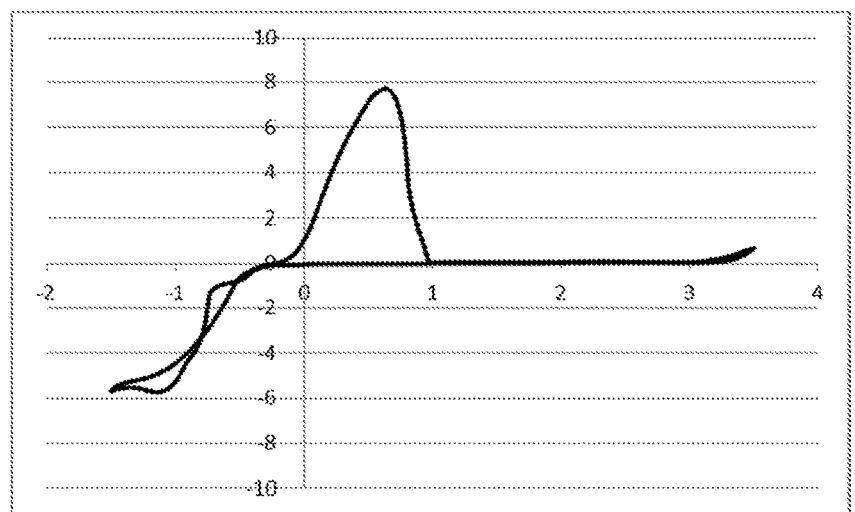
FIG. 8 shows a CV result obtained in the 10$^{th}$ cycle from an electrolytic solution 15 measured in Example 23.
Figure 9:
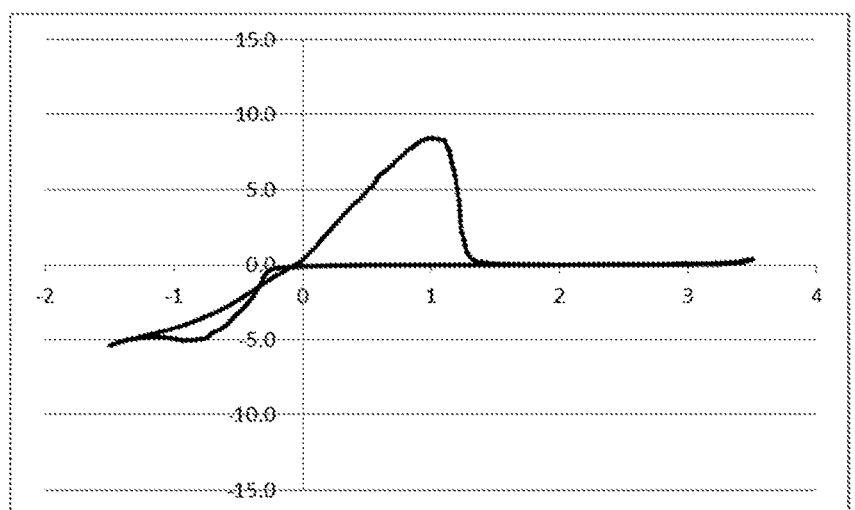
FIG. 9 shows a CV result obtained in the 10$^{th}$ cycle from an electrolytic solution 16 measured in Example 23.
Figure 10:
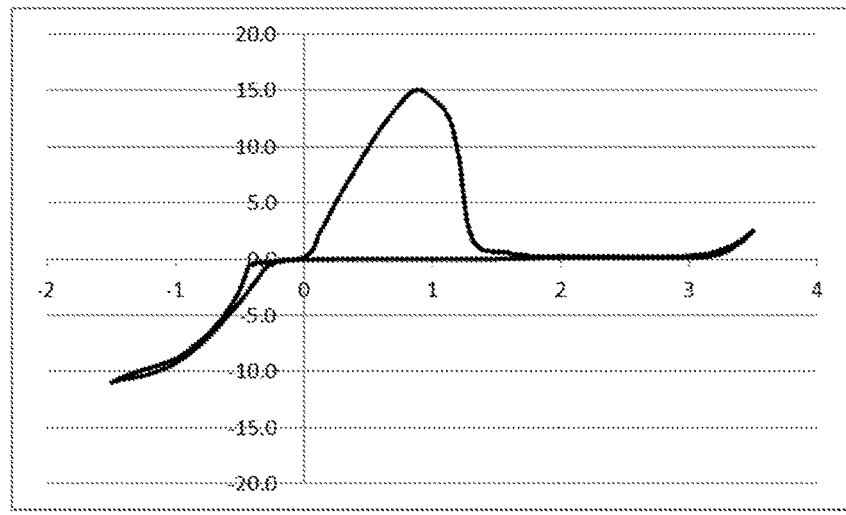
FIG. 10 shows a CV result obtained in the 10$^{th}$ cycle from an electrolytic solution 17 measured in Example 23.
Figure 11:
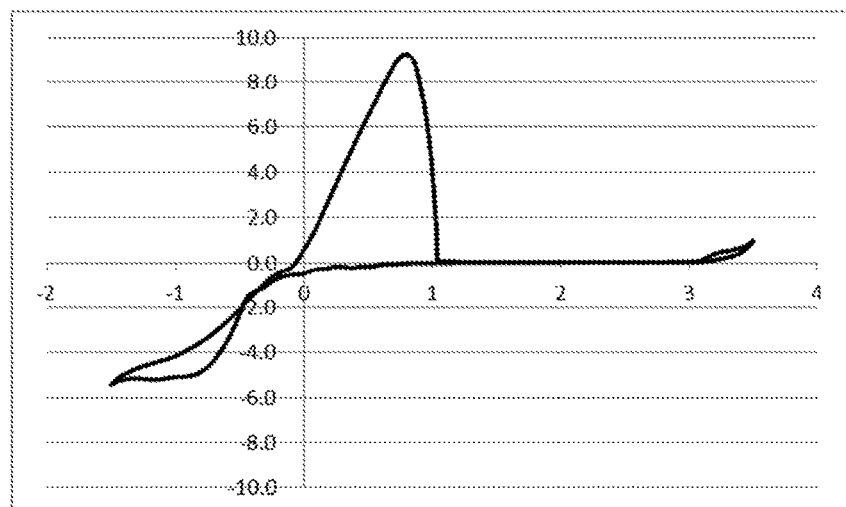
FIG. 11 shows a CV result obtained in the 10$^{th}$ cycle from an electrolytic solution 19 measured in Example 23.
Figure 12:
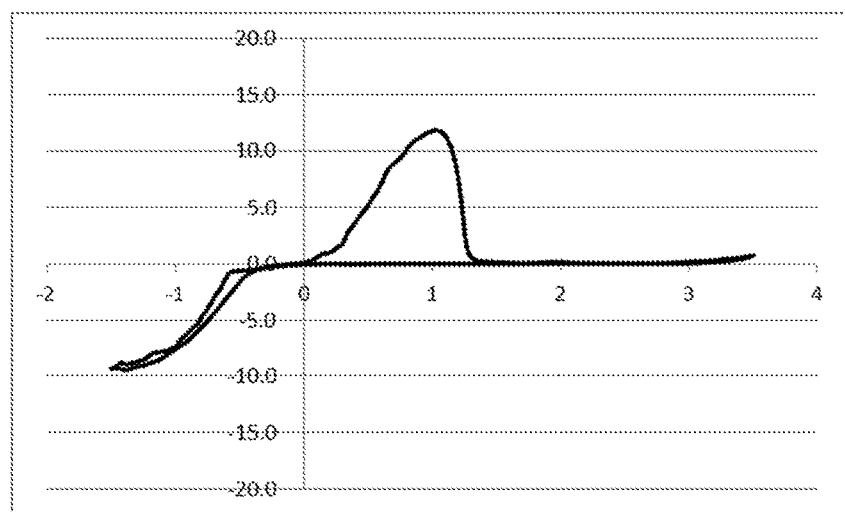
FIG. 12 shows a CV result obtained in the 10$^{th}$ cycle from an electrolytic solution 20 measured in Example 23.
Figure 13:
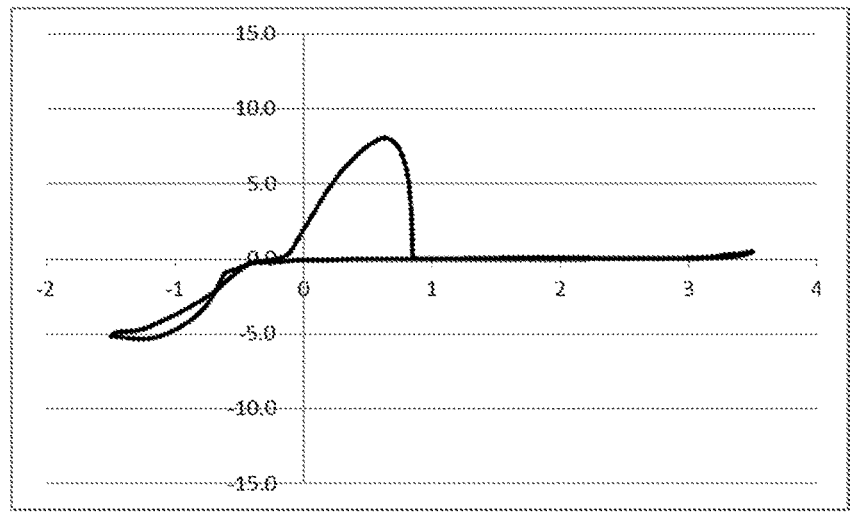
FIG. 13 shows a CV result obtained in the 10$^{th}$ cycle from an electrolytic solution 21 measured in Example 23.
Figure 14:
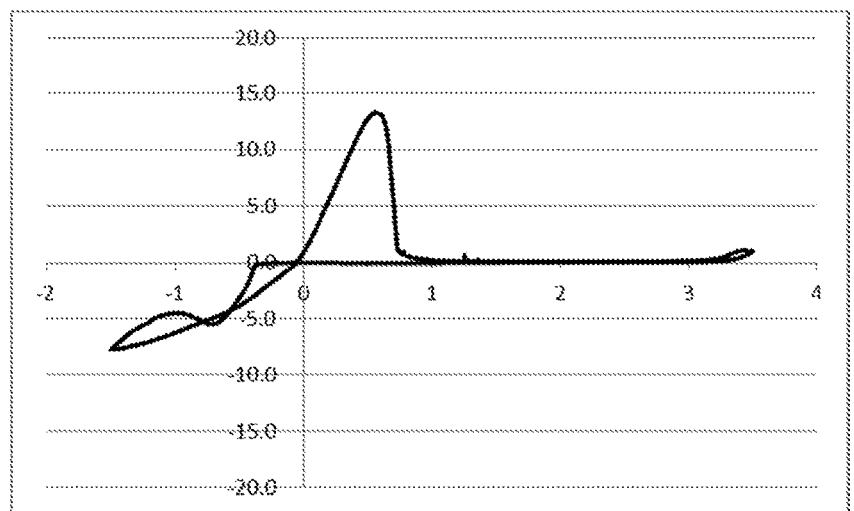
FIG. 14 shows a CV result obtained in the 10$^{th}$ cycle from an electrolytic solution 22 measured in Example 23.
Figure 15:
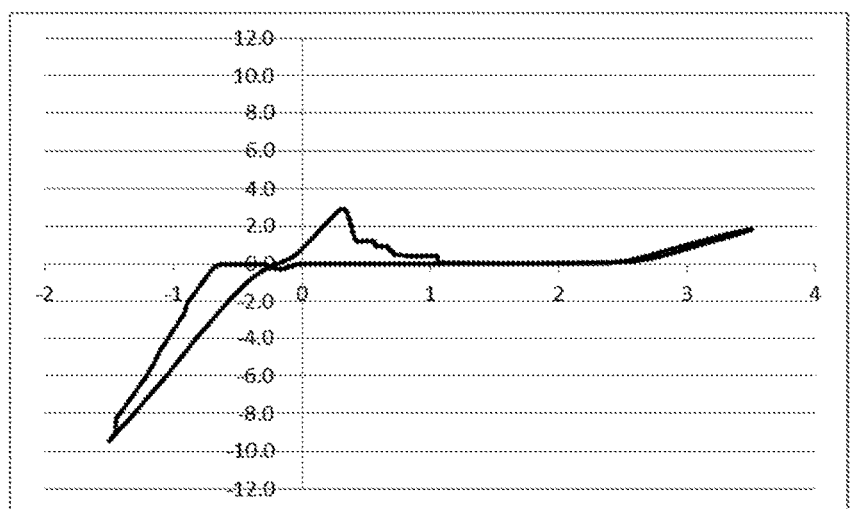
FIG. 15 shows a CV result obtained in the 10$^{th}$ cycle from a comparative electrolytic solution 1 measured in Comparative Example 2.

In addition, the result obtained from the electrolytic solution 1 in the $10^{th}$ cycle is shown in FIG. 1; the result obtained from the electrolytic solution 4 in the $10^{th}$ cycle is shown in FIG. 2; the result obtained from the electrolytic solution 8 in the $10^{th}$ cycle is shown in FIG. 3; the result obtained from the electrolytic solution 9 in the $10^{th}$ cycle is shown in FIG. 4; the result obtained from the electrolytic solution 10 in the $10^{th}$ cycle is shown in FIG. 5; the result obtained from the electrolytic solution 12 in the $10^{th}$ cycle is shown in FIG. 6; the result obtained from the electrolytic solution 13 in the $10^{th}$ cycle is shown in FIG. 7; the result obtained from the electrolytic solution 15 in the $10^{th}$ cycle is shown in FIG. 8; the result obtained from the electrolytic solution 16 in the $10^{th}$ cycle is shown in FIG. 9; the result obtained from the electrolytic solution 17 in the $10^{th}$ cycle is shown in FIG. 10; the result obtained from the electrolytic solution 19 in the $10^{th}$ cycle is shown in FIG. 11; the result obtained from the electrolytic solution 20 in the $10^{th}$ cycle is shown in FIG. 12; the result obtained from the electrolytic solution 21 in the $10^{th}$ cycle is shown in FIG. 13; the result obtained from the electrolytic solution 22 in the $10^{th}$ cycle is shown in FIG. 14; and the result obtained from the comparative electrolytic solution 1 in the $10^{th}$ cycle is shown in FIG. 15. It should be noted that in the drawing the abscissa represents the potential of the working electrode based on the potential of the reference electrode, and the ordinate represents the current density (mA/cm$^2$) determined by dividing the value of current observed at each potential by the surface area of the working electrode.

TABLE 1

| Electrolytic solution | | Oxidative decomposition potential |
|---|---|---|
| Example 1 | PhB(OMgCl)$_2$—AlCl$_3$/THF | +3.2 V |
| Example 2 | (2,6-Me$_2$C$_6$H$_3$)B(OMgCl)$_2$—AlCl$_3$/THF | +3.1 V |
| Example 3 | (4-MeC$_6$H$_4$)B(OMgCl)$_2$—AlCl$_3$/THF | +3.0 V |
| Example 4 | (2,6-(MeO)$_2$C$_6$H$_3$)B(OMgCl)$_2$—AlCl$_3$/THF | +3.1 V |
| Example 5 | (4-(MeO)C$_6$H$_4$)B(OMgCl)$_2$—AlCl$_3$/THF | +3.0 V |
| Example 6 | (2,6-F$_2$C$_6$H$_3$)B(OMgCl)$_2$—AlCl$_3$/THF | +3.0 V |
| Example 7 | MeB(OMgCl)$_2$—AlCl$_3$/THF | +3.0 V |
| Example 8 | B(OMgCl)$_3$—AlCl$_3$/Triglyme | +3.2 V |
| Example 9 | B(OMgCl)$_3$—AlCl$_3$/Triglyme-THF | +3.4 V |
| Example 10 | B(OMgCl)$_3$—Mg(TFSI)$_2$/Triglyme | +3.2 V |
| Example 11 | 1-(C$_{10}$H$_7$)B(OMgCl)$_2$—AlCl$_3$/Triglyme | +3.0 V |
| Example 12 | 9-(C$_{14}$H$_9$)B(OMgCl)$_2$—AlCl$_3$/THF | +3.0 V |
| Example 13 | 3-(C$_6$H$_4$)[B(OMgCl)$_2$]$_2$—AlCl$_3$/Triglyme | +3.0 V |
| Example 14 | 4-(C$_6$H$_4$)[B(OMgCl)$_2$]$_2$—AlCl$_3$/Triglyme | +3.0 V |
| Example 15 | (2-(C$_6$H$_5$)C$_6$H$_4$)B(OMgCl)$_2$—AlCl$_3$/Triglyme | +3.0 V |
| Example 16 | (3-(C$_6$H$_5$)C$_6$H$_4$)B(OMgCl)$_2$—AlCl$_3$/Triglyme | +3.1 V |
| Example 17 | (4-(PhO)C$_6$H$_4$)B(OMgCl)$_2$—AlCl$_3$/THF | +3.0 V |
| Example 18 | 3-(C$_4$H$_3$O)B(OMgCl)$_2$—AlCl$_3$/Triglyme | +3.0 V |
| Example 19 | 2-(C$_8$H$_5$O)B(OMgCl)$_2$—AlCl$_3$/Triglyme | +3.0 V |
| Example 20 | 3-(C$_4$H$_3$S)B(OMgCl)$_2$—AlCl$_3$/THF | +3.0 V |
| Example 21 | 2-(C$_4$H$_3$S)B(OMgCl)$_2$—AlCl$_3$/Triglyme | +3.0 V |
| Example 22 | 4-(C$_5$H$_4$N)B(OMgCl)$_2$—AlCl$_3$/THF | +3.1 V |
| Comparative Example 1 | Ph$_2$B(OMgCl)—AlCl$_3$/THF | +2.5 V |

From the results in Table 1, it was found that the electrolytic solutions (Examples 1 to 22) of the present invention containing a magnesium salt of boric acid and a magnesium salt of boronic acid have oxidative stability that is markedly higher than that of the electrolytic solution (Comparative Example 1) formed of a magnesium salt of borinic acid. That is, it was found that among the magnesium salts of boric acid, boronic acid, and borinic acid, the magnesium salts of boric acid or boronic acid having two or three —OMgCl groups has higher oxidative stability than that of the magnesium salt of borinic acid having only one —OMgCl group.

In addition, it was found that all the electrolytic solutions for a magnesium battery of the present invention exhibit an oxidative decomposition potential of +3.0 V to +3.4 V for magnesium, and they can be used with oxidative stability (oxidative decomposition potential) equivalent to or higher than that of known boron-based electrolytic solutions.

Furthermore, as is evident from the result in FIG. 4 (result obtained using electrolytic solution 9 of Example 9), it was found that the current density can be significantly improved by using mixed solvent as the solvent according to the present invention.

Example 24: Preparation of Electrochemical Device and Charge-Discharge Test

A cell was constructed using a Mo$_6$S$_8$ electrode, prepared based on the method described in a literature (J. Electrochem. Soc., 2014, 161, A593), as a working electrode, magnesium as a counter electrode and a reference electrode, and electrolytic solution 9 prepared in Example 9.

Figure 16:
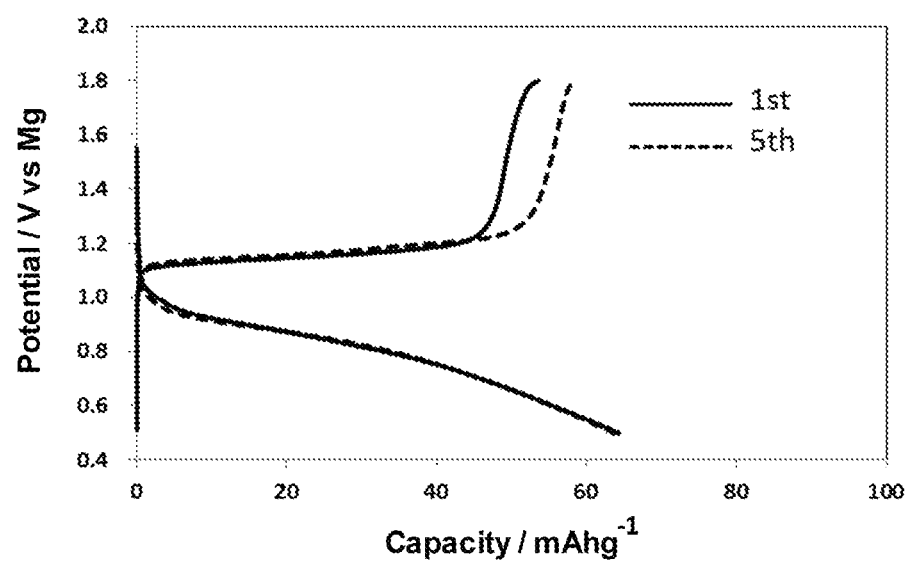
FIG. 16 shows a charge-discharge curve of a cell which is prepared using the electrolytic solution 9 and measured in Example 24.

FIG. 16 shows a charge-discharge curve obtained by performing a charge-discharge test at a cutoff potential of 0.5 V to 1.8 V and a rate of C/20.

In FIG. 16, the result obtained in the first cycle is represented by a solid line, and the result obtained in the $5^{th}$ cycle is represented by a dotted line. It should be noted that the abscissa represents a discharge capacity (mAh/g) at each potential, and the ordinate represents the potential of the working electrode based on the potential of the reference electrode.

As is evident from the result in FIG. 16, it was found that the batteries prepared using the electrolytic solution of the present invention operate as a secondary battery device.

INDUSTRIAL APPLICABILITY

The electrolytic solution for a magnesium battery of the present invention has a high oxidative decomposition potential. Accordingly, the electrolytic solution is useful, for example, as an electrolytic solution for magnesium secondary batteries.

The invention claimed is:

1. An electrolytic solution for a magnesium battery comprising: a compound represented by the general formula (I); a Lewis acid or a compound represented by the general formula (A); and a solvent that are mixed together;

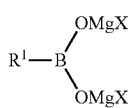  (I)

wherein two X's each independently represent a halogeno group, and $R^1$ represents an alkyl group having 1 to 6 carbon atoms; an alkoxy group having 1 to 6 carbon atoms, a phenoxy group, an —OMgX group, an aryl group having 6 to 18 carbon atoms that has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group or is unsubstituted; or a monocyclic or bicyclic heterocyclic group that has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)$_2$ group or is unsubstituted, X in the —OMgX group and the —B(OMgX)$_2$ group is the same as X described above; and Mg[N(SO$_2$R$^6$)$_2$]$_2$  (A)

wherein four $R^6$'s each independently represent an alkyl group having 1 to 6 carbon atoms, a perfluoroalkyl group having 1 to 6 carbon atoms, a phenyl group, or a perfluorophenyl group.

2. The electrolytic solution for a magnesium battery according to claim 1, wherein the Lewis acid comprises beryllium, boron, aluminum, silicon, tin, titanium, chromium, iron, or cobalt as an element.

3. The electrolytic solution for a magnesium battery according to claim 1, wherein the Lewis acid comprises aluminum as an element.

4. The electrolytic solution for a magnesium battery according to claim 1, wherein the Lewis acid is aluminum chloride.

5. The electrolytic solution for a magnesium battery according to claim 1, wherein the compound represented by the general formula (A) is magnesium bis(trifluoromethanesulfonyl)imide.

6. The electrolytic solution for a magnesium battery according to claim 1, wherein X in the compound represented by the general formula (I) is a chloro group.

7. The electrolytic solution for a magnesium battery according to claim 1, wherein the solvent is an ether solvent, a halogenated hydrocarbon solvent, a carbonate solvent, a nitrile solvent, or a sulfone solvent.

8. An electrochemical device comprising: the electrolytic solution according to claim 1; a positive electrode; and a negative electrode.

9. A compound represented by the general formula (I):

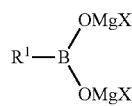  (I)

wherein two X's each independently represent a halogeno group, and $R^1$ represents an alkyl group having 1 to 6 carbon atoms, an alkoxy group having 1 to 6 carbon atoms, a phenoxy group, an —OMgX group, an aryl group having 6 to 18 carbon atoms that has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)2 group or is unsubstituted, or a monocyclic or bicyclic heterocyclic group that has, as a substituent, an alkyl group having 1 to 6 carbon atoms, an alkoxy group having 1 to 6 carbon atoms, a vinyl group, a phenyl group, a phenoxy group, a halogeno group, or a —B(OMgX)2 group or is unsubstituted, X in the —OMgX group and the —B(OMgX)2 group is the same as X described above.

* * * * *